(12) United States Patent
Villanueva et al.

(10) Patent No.: US 11,126,904 B2
(45) Date of Patent: Sep. 21, 2021

(54) DYNAMIC AD-HOC CHALLENGE-COIN DEVICE NETWORKING WITH SECURE PROXIMITY-BASED PSEUDO-RANDOM CONNECTIVITY, METHODS OF TREATMENT USING SAME

(71) Applicant: Lito, Corp., Las Vegas, NV (US)

(72) Inventors: Lito Villanueva, Las Vegas, NV (US); William D. Davis, San Bruno, CA (US)

(73) Assignee: LITO, CORP., Las Vegas, NV (US)

( * ) Notice: Subject to any disclaimer, the term of this patent is extended or adjusted under 35 U.S.C. 154(b) by 0 days.

(21) Appl. No.: 16/670,609

(22) Filed: Oct. 31, 2019

(65) Prior Publication Data
US 2020/0143217 A1    May 7, 2020

Related U.S. Application Data

(60) Provisional application No. 62/753,707, filed on Oct. 31, 2018.

(51) Int. Cl.
*G06K 19/07* (2006.01)
*G06K 19/04* (2006.01)
*G06K 19/077* (2006.01)

(52) U.S. Cl.
CPC ....... *G06K 19/0723* (2013.01); *G06K 19/047* (2013.01); *G06K 19/0705* (2013.01); *G06K 19/07705* (2013.01); *G06K 19/07715* (2013.01)

(58) Field of Classification Search
CPC .................................................. G06K 19/0723
USPC ...................................................... 235/492
See application file for complete search history.

(56) References Cited

U.S. PATENT DOCUMENTS

| | | | | |
|---|---|---|---|---|
| 2009/0196021 | A1* | 8/2009 | Liu | G03B 29/00 362/118 |
| 2016/0065268 | A1* | 3/2016 | Dobyns | H04L 63/107 455/41.1 |
| 2017/0048691 | A1* | 2/2017 | Liu | A24F 47/00 |

FOREIGN PATENT DOCUMENTS

| | | |
|---|---|---|
| JP | 2008-011296 A | 1/2008 |
| JP | 10-086567 A | 4/2010 |

OTHER PUBLICATIONS

International Search Report issued for PCT/US2019/059179, dated Feb. 18, 2020.

* cited by examiner

*Primary Examiner* — Rafferty D Kelly
(74) *Attorney, Agent, or Firm* — Cooley LLP

(57) ABSTRACT

An apparatus includes a substantially cylindrical housing, a power source, a processor, a communications interface, and an indicator. During operation, a functionalized coin is detected, by the apparatus, as being within a predefined distance of the apparatus. In response to detecting the presence of the functionalized coin within the predefined distance, the apparatus can cause the indicator to exhibit an indication such as vibration and/or light emission. The indicator can include a vibration motor, or a light-emitting diode (LED). The apparatus is sized to fit within a palm of a hand of a human user. The apparatus can also transmit, via the communications interface, a radio frequency beacon signal, and receive, via the communications interface, a reply to the beacon signal and, in turn, transmit a confirmation of receipt of the reply to the beacon signal, to establish a communications connection between the apparatus and the functionalized coin.

19 Claims, 18 Drawing Sheets

DYNAMIC AD-HOC CHALLENGE-COIN DEVICE NETWORKING WITH SECURE PROXIMITY-BASED PSEUDO-RANDOM CONNECTIVITY, METHODS OF TREATMENT USING SAME

CROSS-REFERENCE TO RELATED APPLICATIONS

This application claims priority to and the benefit of U.S. Provisional Patent Application No. 62/753,707, titled "Dynamic Ad-Hoc Challenge-Coin Device Networking with Secure Proximity-Based Pseudo-Random Connectivity, Methods of Treatment Using Same," filed Oct. 31, 2018, the disclosure of which is hereby incorporated by reference in its entirety.

BACKGROUND

Military service members are often meticulously trained to operate in a hyper-focused 'flow' state in a military war operation. Such conditions can produce, in the service member, a heightened situational awareness and hypersensitivity that can hamper the service member's ability to recuperate or recover from the experience of war.

According to some embodiments, a first network-functionalized challenge coin device is capable of communicating with a second network-functionalized challenge coin device by establishing a dynamic ad-hoc network connection with the second challenge coin device.

SUMMARY

In some embodiments, an apparatus includes a substantially cylindrical housing, a power source disposed within the housing, a processor disposed within the housing and electrically coupled to the power source, a communications interface (e.g., one or more antennas) disposed one of within or on an exterior of the housing and electrically coupled to the power source, and an indicator disposed at least partially within the housing. During operation, the processor executes instructions (e.g., stored in memory of the apparatus and/or retrieved via wireless communication with one or more remote compute devices) to detect the presence of a functionalized coin within a predefined distance of the apparatus. Also during operation, the processor executes instructions to cause a supply of power from the power source to the indicator to cause the indicator to exhibit an indication (e.g., a physical vibration and/or an emission of light), in response to detecting the presence of the functionalized coin within the predefined distance. The apparatus is sized to fit within a palm of a hand of a human user. The indicator can include at least one of a piezoelectric motor or a haptic motor (optionally including an internal vibrating disc). Alternatively or in addition, the indicator can include at least one light-emitting diode (LED). In some embodiments, during operation, the processor also executes instructions to transmit, via the communications interface, a radio frequency beacon signal, and receive, via the communications interface, a reply to the beacon signal. The processor can also execute instructions to transmit, via the communications interface, a confirmation of receipt of the reply to the beacon signal in response to receiving the reply to the beacon signal.

In some embodiments, the substantially cylindrical housing includes a rotatable center portion, and the apparatus can be configured to control a supply of power from the power source in response to a rotation of the rotatable center portion.

In some embodiments, a method of communication between functionalized coins includes transmitting, from a first handheld coin-shaped apparatus, a radio frequency beacon signal, and receiving, at the first handheld coin-shaped apparatus and from a second handheld coin-shaped apparatus, a reply to the beacon signal. The method also includes transmitting, from the first handheld coin-shaped apparatus and to the second handheld coin-shaped apparatus, and in response to receiving the reply to the beacon signal, a signal representing a confirmation of receipt of the reply to the beacon signal, thereby establishing a communications connection between the first handheld coin-shaped apparatus and the second handheld coin-shaped apparatus. The method optionally also includes transmitting a keepalive signal from the first handheld coin-shaped apparatus to the second handheld coin-shaped apparatus. The transmission of the keepalive signal can be performed periodically, at predetermined time intervals. The method optionally also includes terminating the communications connection between the first handheld coin-shaped apparatus and the second handheld coin-shaped apparatus if a reply to the keepalive signal is not received within a predefined time period of the transmission of the keepalive signal.

In some embodiments, a method of communication between functionalized coins includes monitoring, at a first handheld coin-shaped apparatus, a port of the first handheld coin-shaped apparatus for an incoming signal, and receiving, at the first handheld coin-shaped apparatus via the port, and from a second handheld coin-shaped apparatus, a beacon signal. The method also includes transmitting, from the first handheld coin-shaped apparatus and to the second handheld coin-shaped apparatus, an acknowledgment message in response to receiving the beacon signal, and receiving, at the first handheld coin-shaped apparatus and from the second handheld coin-shaped apparatus, a signal representing a confirmation of receipt of the acknowledgment message, thereby establishing a communications connection between the first handheld coin-shaped apparatus and the second handheld coin-shaped apparatus.

In some embodiments, a system includes a first handheld coin-shaped apparatus and a second handheld coin-shaped apparatus. The first handheld coin-shaped apparatus includes an antenna, a processor, a memory, a power supply, a proximity sensor that utilizes a wireless communication frequency, and a housing. The second handheld coin-shaped apparatus also includes an antenna, a processor, a memory, a power supply, a proximity sensor that utilizes a wireless communication frequency, and a housing. During operation, the first handheld coin-shaped apparatus responds to the second handheld coin-shaped apparatus when the first handheld coin-shaped apparatus and the second handheld coin-shaped apparatus are within a predetermined range of each other. Each handheld coin-shaped apparatus can have its own network function capability such that the underlying network connectivity between the first handheld coin-shaped apparatus and the second handheld coin-shaped apparatus does not rely on internet peering, mobile data, or cellular service connection.

DETAILED DESCRIPTION

Figure 1:
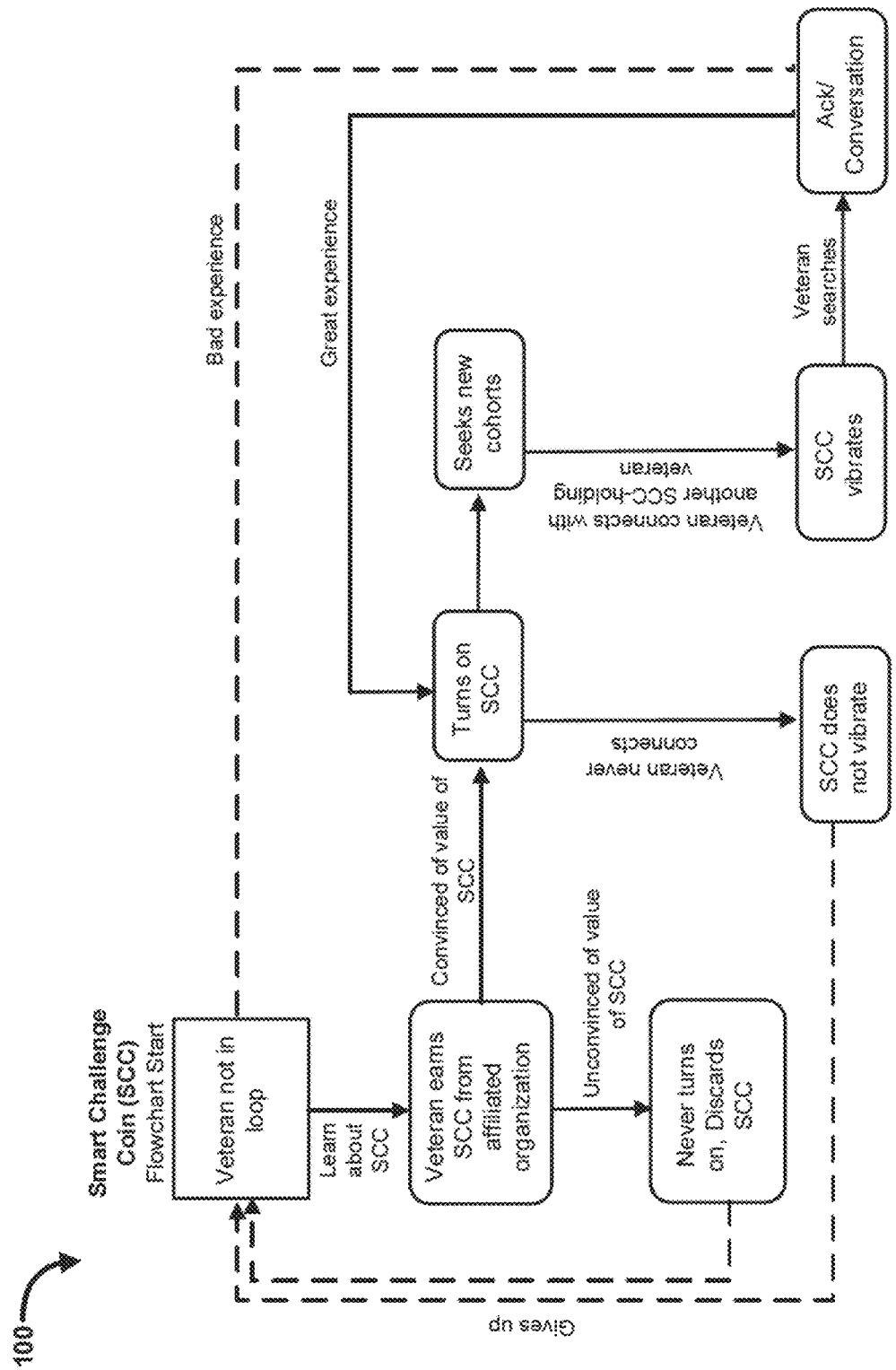
FIG. 1 is a flow diagram showing operation of a Smart Challenge Coin (SCC), according to some embodiments.

Soldiers and other service members returning from war or other traumatic environments face a wide variety of challenges that can include mental health challenges. In environments such as the military, however, there is an unfortunate but prevailing cultural stigma about mental health that can prevent (or make reluctant) the service member from disclosing their mental health issues and/or from seeking help. For example, some service members fear that they will be reprimanded by their chain of command, or that they will receive a derogatory mark on their record of service. Depression, substance addiction, and suicidal ideation are often underreported within the military community, and the culturally learned behavior of emotional hardening can continue after military service has terminated (e.g., when the individual is placed in a veteran status). Moreover, there are few effective options available to service members (e.g., when transitioning back into civilian life) for de-stressing or otherwise relieving or resolving the symptoms of mental illness. As such, the mindsets of veteran service members can remain "back at war," and their mental health symptoms can endure for many years.

Other service members may feel ashamed, guilty, or embarrassed, for example, of not having had the opportunity to serve in what he or she perceives to be a sufficiently military environment. For example, an individual who has never deployed may believe that they are 'not good enough' to call themselves a veteran. This psychological condition can be referred to as 'veteran imposter syndrome.' These feelings of shame and embarrassment can lead the service member to socially isolate themselves and/or to feel stigmatized within the military community to which they belong.

Approximately 20 military servicemembers and prior-servicemembers take their lives every day. Per 100,000 people, the suicide rate is approximately 1.5× higher for men (32.1) and 5× higher for women (28.7) who have served in the military, compared to the civilian rates of men and women who have never served (20.9, 5.2, respectively). Significant numbers of prior-servicemembers (veterans) and currently active-duty servicemembers have had thoughts of suicidal ideation at least once, and many senior military leaders have witnessed, either in their own command, or in a command with which they are familiar, a servicemember killing himself/herself. Servicemembers can be reluctant to discuss suicidal ideation due to the stigmatization of mental health issues and the perception that they will be regarded as weak. Moreover, being deemed mentally unfit for duty places a servicemember into a non-deployable status. No soldier, airmen, corpsman, guardsman or marine wants to be unable to do their job, or worse yet, be stigmatized by their peers for having suicidal thoughts. Self-harm and suicidal ideation are mental illness symptoms that can be nuanced within the defense community, leading to a psychological prison from which the affected individual cannot escape.

Apparatuses and systems of the present disclosure were devised to help prevent military and veteran suicides, and have applicability in a wide range of other applications. For example, a smart challenge coin (SCC) according to the present disclosure is a proximity networking tool, which can also serve as a medical device or accessory, and which can reduce or eliminate suicidal ideation and/or other symptoms of mental illness by creating a physical and mental space within which a service member can openly talk about mental health concerns to trusted parties, resources, and peer individuals willing to assist in the healing process wherever and whenever an interaction may occur. The SCC is a physical token that reminds the SCC-holder they belong to an organization that cares about them, and enables the holder to connect to a real community. The use of the SCC facilitates interaction between individuals (e.g., servicemembers) with similar affiliations, interests, cultural backgrounds, etc., to improve physical and mental well-being of the individuals.

The resolution of self-harm and self-isolation behaviors can be enhanced or impacted by authentic interpersonal connections between the affected service member and one or more sympathetic peers. Apparatuses and systems of the present disclosure can facilitate the establishing of such connections. It is believed that the engagement of military communities, as well as fostering open lines of non-judgmental, authentic communication, can contribute significantly to preventing suicides. Such authentic communication networks between peers and leaders are facilitated by Smart Challenge Coin (SCC) apparatuses and methods set forth herein. The inventors are not aware of any other device that is capable of representing a qualitative connection between specific individuals. SCCs of the present disclosure leverage and evoke the military cultural values of belonging, purpose, mission, inclusion and interconnectedness. SCCs can, for example, have an outward appearance similar to known "challenge coins" which are solid metal coins (often including a stamped logo or insignia) that are traditionally distributed by leadership during military award ceremonies as a recognition of an accomplishment, effort, contribution, or term of service. The culture in which challenge coins are distributed can be referred to as a "camaraderie culture." This camaraderie culture is captured in a physical and tangible manner via the challenge coin. Some individuals, however, may not have ever received a challenge coin, or may have never had that feeling of recognition, value, validation, inclusion, or sense of worth to the organization in which they serve.

In some embodiments, a recipient of an SCC understands that upon receipt of an SCC, he/she has attained a certain threshold of cultural acceptance, and that acceptance is being recognized by the person giving the coin (e.g., the recipient's commander or other member of the leadership chain-of-command). Earning an SCC coin can signify to the SCC-holder (or "bearer") an attainment of status within the shared culture. Subsequently, during operation, the SCC can connect with another SCC, and vice-versa, signifying to the SCC-holder that the individual they connected to has also attained a similar status within the shared culture. In some implementations, the status can be related to a service event, service history, a self-diagnosis or self-reporting of a mental health condition (e.g., depression, post-traumatic stress (PTS), etc.), a medical diagnosis of a mental health condition, a past suicide attempt (whether documented or self-reported), etc.

In some embodiments, ad-hoc interactions are facilitated between two or more SCCs, for example to help mitigate their perception(s) of isolation. A heightened mood or sense of expectancy, similar to a flooding of dopamine neurotransmitters, can be observed in a user who is simply carrying the SCC while the SCC is turned on. SCC connections can be location-dependent, for example being activated by a physical proximity (e.g., within a predefined or specifically engineered distance/radius) of another SCC-holder. The SCC can be viewed as a representation of a gateway to trusted network of individuals (i.e., other SCC-holders) that are in close proximity of one another.

In some embodiments, an SCC system includes a capability for facilitating consent based immediate crisis response for SCC-holders.

SCC-holders are not limited to military and veteran service members. There are, for example, many professions in which similar traditions exist of awarding coins, such as law enforcement, firefighters, first responders, international aid, and government employees.

In some embodiments, an SCC is a portable device including one or more sensors and configured to vibrate in the pocket of a user clandestinely when another holder of the SCC is nearby. The SCC can also include one or more visual indicators (e.g., light-emitting diode(s), optionally in a strip configuration). At least a portion of the SCC can be fabricated using one or more three-dimensional (3-D) printing techniques (e.g., metallic 3-D printing). The SCC can be configured to operate autonomously, separately from and without the involvement of, a smartphone or other mobile electronic device. Alternatively or in addition, the SCC can include a memory storing personally identifiable information (PII) of a SCC holder, as well as one or more cybersecurity measures to protect the PII. Alternatively or in addition, the SCC can include an emergency button/selector that can trigger the transmission of a beacon signal to one or more nearest SC holders and/or to a crisis-response system such as a behavioral family therapy (BFT) system. Alternatively or in addition, the SCC can include a WiFi® off switch/button and/or a Bluetooth off switch/button. Alternatively or in addition, the SCC can be configured to communicate with other SCCs within a no-network zone such as a sensitive compartmented information facility (SCIF) inside a military base. SCCs can be distributed to servicemembers by key leaders and senior officers. The distribution of SCCs can create a 'subculture' community within which possession of a SCC signifies belonging.

An example SCC implementation, involving a veteran, is shown in FIG. 1. As shown in FIG. 1, a method 100 begins with a veteran who is not yet part of the SCC system (i.e., he/she does not yet has an SCC in his/her possession). The veteran may learn about the SCC, for example from a peer. Subsequently, the veteran earns (e.g., from an affiliated organization) or otherwise takes possession of an SCC. Assuming that the veteran is not unconvinced of the SCC's value, the veteran turns on the SCC (e.g., via a power button or other interface). Once the SCC is on, if the veteran is not in the proximity of another SCC bearer at any time, the SCC will not vibrate or otherwise indicate to the veteran that another SCC bearer is nearby. If, on the other hand, the veteran does connect with another SCC bearer (e.g., another veteran), the SCC will vibrate or otherwise indicate to the veteran that the other SCC bearer is nearby. In response to the indication, the veteran may visually scan the area is which he/she is located, to identify the other SCC bearer. Once the other SCC bearer has been located by the veteran, he/she may acknowledge so, e.g., via an interface on the SCC itself and/or via a software application (e.g., a mobile "app" in communication with the SCC, for example). The veteran's propensity to use the SCC can be based on his/her experience with the SCC (e.g., frequency of connection with other SCC bearers, etc.).

Challenge Coins—Background

Some known challenge coins are used for games, such as drinking games. Other known challenge coins are presented to individuals (e.g., as part of a ritual/ceremony) who earn the challenge coins by accomplishing an act of good faith that a peer and/or a leader in that individual's Chain of Command recognizes as valuable or meriting recognition (e.g., as part of a tradition in military and government cultures in the United States). An example ritual for giving and receiving a coin is as follows:

1. The challenge coin giver presents a challenge coin in his or her hand in a semi-upward manner as to not let the coin fall out of their hand.
2. The challenge coin receiver shakes the hand of the challenge coin giver, at the same time, rotating the giver's hand from upward to downward, such that the coin falls into the hands of the receiver.
3. The challenge coin has now been transferred, via a handshake, from the challenge coin giver to the challenge coin receiver.

The known challenge coins described above typically are monolithic metal coins with a logo or other design stamped on one or both sides thereof. Because such coins are solid metal, they lack functionality. Many prior-service military servicemembers still carry a challenge coin in their day-to-day operations, for example because the challenge coin serves as a reminder of association to their time in service, or as a representation of a reminder of their accomplishments. Not all servicemembers, however, whether current or former, choose to carry their challenge coins. Servicemembers may be more likely to carry their challenge coins if they subjectively feel that the challenge coins have intrinsic intangible value.

Smart Challenge Coin (SCC) Overview

In contrast with the known challenge coins discussed above, in some embodiments, the SCC is a physical medallion resembling a tangible challenge coin but with added functionality for use by servicemembers and others who may benefit from discreet interactions with their peers. Embodiments set forth herein improve upon the known ritualistic exchange of challenge coins by providing SCCs having one or more added functions not present in known challenge coin designs. For example, by embedding electronics into an SCC, the SCC can pseudo-randomly facilitate connection to one or more other SCC holders (via their associated SCCs).

The physical appearance (e.g., dimensions, shape, weight, etc.) of the SCC can resemble that of known challenge coins. Examples of challenge coins can be found on the US President's desk at the Oval Office. The SCC may be manufactured using (and thus, comprise) one or more of: metallic alloys, ceramic materials, carbon-fiber materials, or composite metamaterials. The fabrication of the SCC can be crafted through subtractive manufacturing (e.g., engraving, cast molding, liquid metal pour over, etc.), and/or additive manufacturing (e.g., with processes such as 3-D printing. The SCC includes software programming and electronic hardware circuitry that cause the supply of power (e.g., from a battery) to perform a variety of functions, such as vibration (haptic feedback, e.g., for signaling) and emission of light (e.g., for signaling), as well as to power radio frequency devices to achieve wireless connectivity with other SCCs.

In some embodiments, a vibrating function may be included within the SCC using a piezoelectric motor that resonates when supplied by a specified voltage, or a haptic motor with an internal vibrating disc. Alternatively or in addition, a light-emission function may be included within the SCC using a light-emitting diode (LED) configured, for example, to emit light having a wavelength that is within the human visible spectrum, or using a light emitter configured, for example, to emit light having a wavelength that is within the non-visual spectrum, such as ultra-violet (UV) emitters or infrared (IR) emitters.

In some embodiments, the SCC includes a physical port into which an electronic, digital, or optical cable can be plugged/connected, for example to transfer data and/or to supply power for charging purposes. Alternatively or in addition, the SCC can include a wireless power induction mechanism to charge the SCC and battery without needing to connect a cable. Alternatively or in addition, the SCC can include an on and off power switch, button, or toggle. Alternatively or in addition, the SCC can include a touch-sensitive resistive or capacitive screen or display. Alternatively or in addition, the SCC can include a physical slider that determines the radio frequencies transmission range. Alternatively or in addition, the SCC can include a physical button that, when actuated, causes transmission of a wireless signal to act as a distress signal, alert signal, and/or locator beacon. Alternatively or in addition, the SCC can include a physical and/or a digital Universally Unique Identification alphanumeric string of characters (e.g., stored within a memory of the SCC) for use in determining the authenticity of the SCC.

Figure 2:
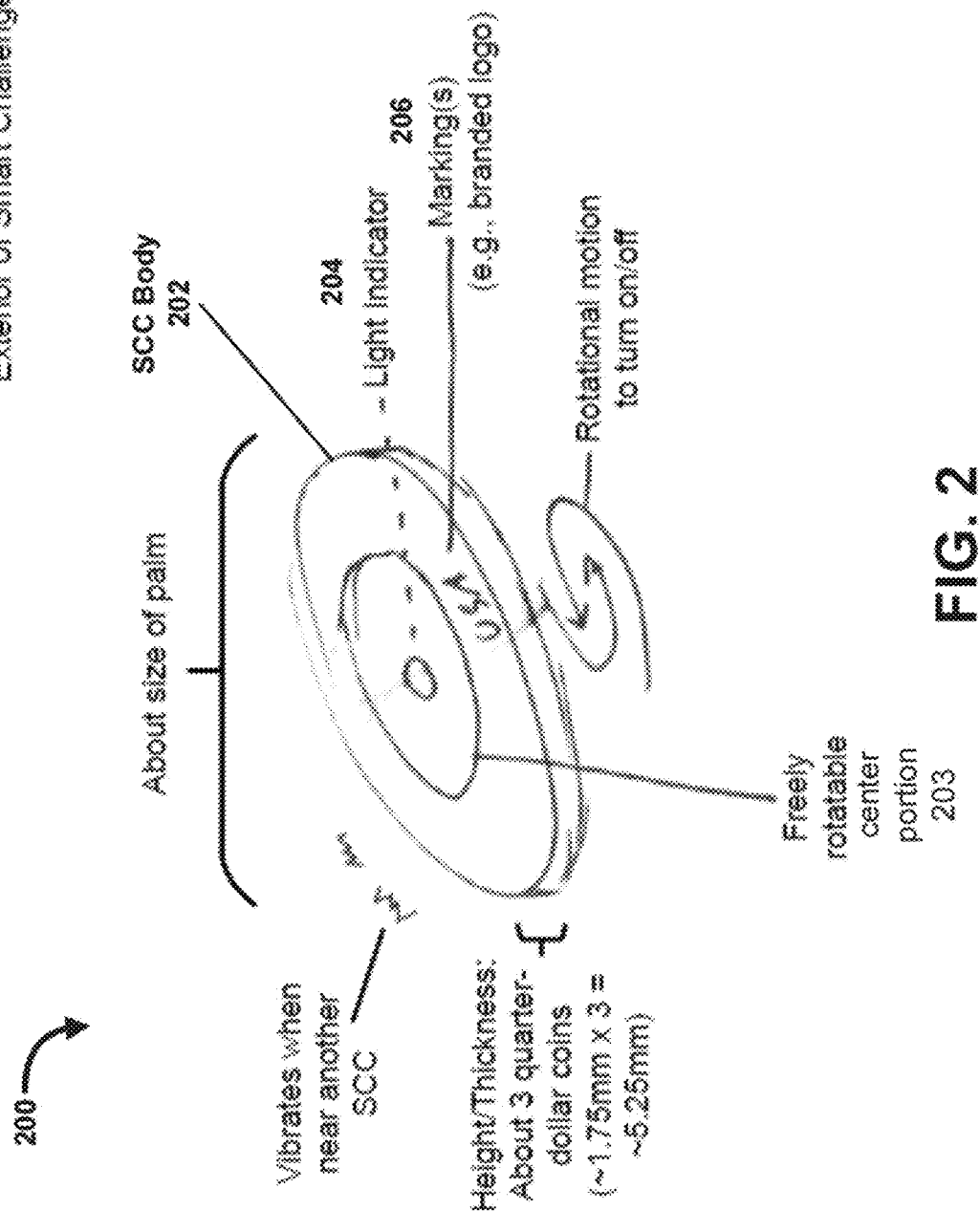
FIG. 2 is a diagram of an exterior of an SCC, according to some embodiments.
Figure 3:
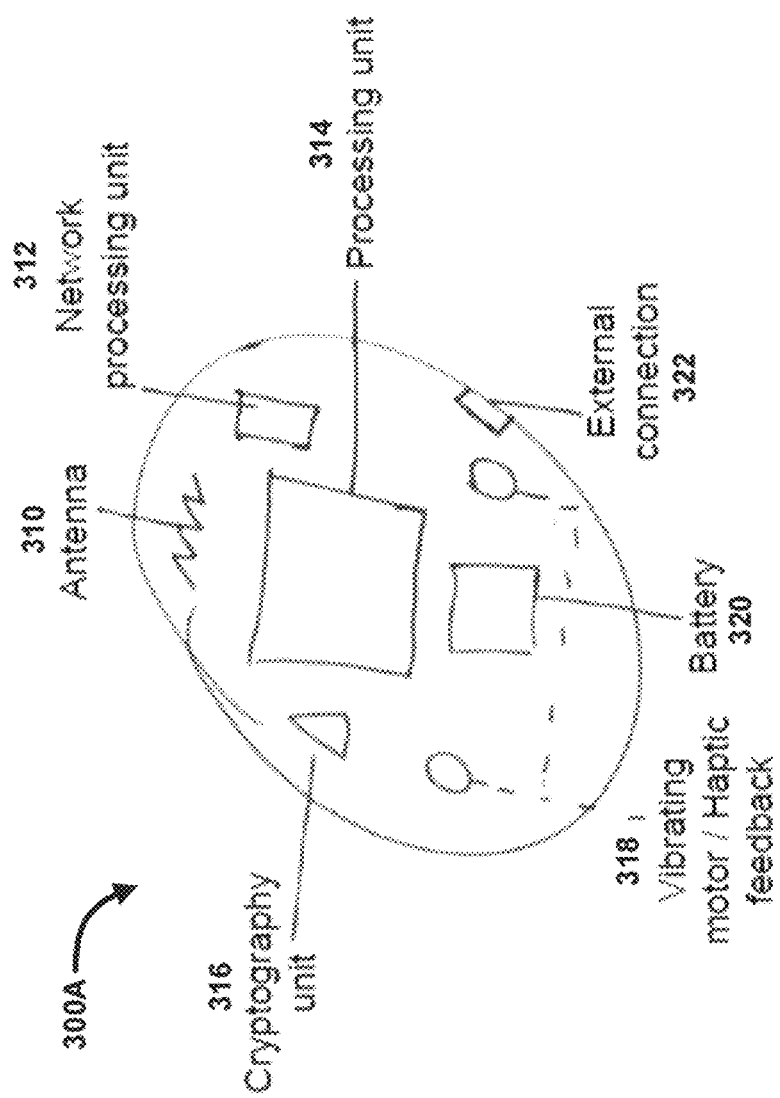
FIG. 3 is a diagram of an interior of an SCC, according to some embodiments.

The SCC can have any of a variety of diameter sizes, and can be sized/shaped, for example, to fit in the palm of an adult hand. The SCC can have any of a variety of heights/thicknesses. For example, an SCC can be approximately the same height as 3 or 4 U.S. quarters stacked on top of one another (i.e., ~1.75 mm×3=~5.25 mm, or ~1.75 mm×3=~7 mm, or less). FIG. 2 is a diagram of an exterior of an SCC, according to some embodiments. FIG. 3 is a diagram of an interior of an SCC, according to some embodiments.

In some embodiments, the SCC includes contains one or more central processing units (CPUs), one or more distributed processing units (DPUs), one or more cryptographic processing units (e.g., a secure cryptoprocessor), and/or one or more wireless radio-frequency-capable network processing units. A secure cryptoprocesor is a dedicated computer-on-a-chip or microprocessor for carrying out cryptographic operations, embedded in a packaging with multiple physical security measures to achieve a degree of tamper resistance.

In some embodiments, the SCC includes a battery (or other power source), a charging unit (e.g., a battery charging unit), and is optionally configured for wireless charging, e.g., via one or more inductive or conductive mediums. The battery can be removable/replaceable, or can be a fixed component of the system, the battery may consist of lithium-polymer batteries, lithium-ion batteries, nuclear batteries, and may be rechargeable or non-rechargeable. The SCC can contain one or more interfaces, such as one or more buttons, for example to facilitate physical interaction with the device. For example, an SCC can include a 'panic button' to notify other trusted individuals (and fellow SCC-holders) that an SCC holder is in distress or otherwise in need of support. In some implementations, at least a portion of the SCC is configured to rotate or otherwise freely move within a body/enclosure of the SCC. In other words, an exterior of the SCC can include two or more components, one of which rotates or otherwise moves within another of the components. The SCC can include one or more indicators including, but not limited to: a vibrating motor, a haptic-feedback module, a display, or a light emitter (e.g., a light-emitting diode (LED)). In some embodiments, the SCC includes an antenna. In some embodiments, an SCC includes global positioning system (GPS) sensor for determining geolocation of the SCC bearer. The SCC can be made of plastic, metal, ceramic, glass, or any combination thereof. The SCC can include a device or component for absorbing heat (e.g., excessive or unwanted heat). In some embodiments, the SCC can include a physical port to connect another input, output, or input/output device for distributed functions related to facilitating secure communications and broadcasting media. Alternatively or in addition, the SCC can wirelessly connect to another input, output, or input/output device for distributed functions related to facilitating secure communications and broadcasting media. In some embodiments, the SCC includes a marking, such as a logo, graphic, text, or brand, that is stamped, etched, painted, CNC-milled, laser-cut, or otherwise imparted to one or more of the top/face, bottom/back, and edge of the coin.

The SCC can utilize one or more of a variety radio frequencies and/or bands, including but not limited to: about 169 Megahertz (MHz), about 433 MHz, about 868 MHz, about 915 MHz, L-band within a range of between about 1.0 and about 2.0 Gigahertz (GHz), Wi-Fi at about 2.5 GHz and/or about 5.0 GHz, Bluetooth at about 2.45 GHz, within a range of between about 2.400 and about 2.4835 GHz ISM (Bluetooth Low Energy), X-Band within a range of between about 7.0 and about 11.2 GHz, Ku-Band within a range of between about 12 and about 18 GHz, Ka-Band within a range of between about 26.5 and about 40 GHz, V-Band within a range of between about 40 and about 75 GHz, W-Band within a range of between about 75 and about 110 GHz, about 900 MHz, about 433 MHz, about 868 MHz, about 915 MHz, etc. The distance over which the foregoing frequencies can operate can range from between about 5 and about 25 feet (e.g., within a small coffeeshop), between about 25 and about 100 feet (e.g., within a small office), between about 100 and about 500 feet (e.g., within a stadium or convention hall), between about 2,500 feet and about 1 mile (e.g., within a neighborhood block), between about 1 and about 10 miles (e.g. within a city), between about 100 and about 1000 miles (e.g. within state borders), between about 1,000 and about 10,000 miles (e.g. within intra-continent or intercontinental territories), or up to 1-10 Astronomical Units (AU) of distance in wireless communications (e.g. within the distance from the Earth to the Sun, or between the Sun and our solar system). In some implementations, the wireless networking functionality of the SCC can be manually turned on and turned off.

In some embodiments, the SCC is physically embedded in a larger system to facilitate secure communications and broadcasting media.

In some embodiments, software updates, software patches, software recovery, and/or device disabling functions can be remotely executed via an over-the-air mechanism, for example using the same onboard wireless-capable network processor, and/or can be functionally described/defined in pseudo-code.

FIG. 2 is a diagram of an exterior of an SCC, according to some embodiments. As shown in FIG. 2, the SCC 200 includes an SCC body 202 (e.g., a housing, which may be in one, two, or multiple parts prior to assembly, or may be monolithically formed), one or more light indicators 204 (e.g., LEDs and/or other light emitters), and one or more markings 206 (e.g., branded logos, graphics, designs, patterns, etc.). The one or more markings 206 can be applied, for example, via additive techniques (e.g., painting, coating, etc.) and/or via subtractive techniques (e.g., etching). As indicated in FIG. 2, the SCC 200 has a substantially circular shape and is size/dimensioned to fit within the palm of a user's hand (e.g., having a diameter of between 1 and 4 inches). The SCC 200 has a height/thickness of about 5.25 mm. The SCC 200 includes a freely rotatable center portion 203 that, when rotated with respect to the outer SCC body 202 (or alternatively, when the SCC body 202 is rotated relative to the center portion 203), causes the SCC 200 to turn on or off (e.g., sequentially with each rotation in a given direction, or depending upon the direction of rotation). The SCC 200 may, for example, vibrate to indicate that it has been turned on. The SCC 200 is also configured to vibrate (and/or emit light from the light indicator 204) when the SCC 200 detects that it is in proximity to another SCC.

FIG. 3 is a diagram of an interior of an SCC, according to some embodiments. As shown in FIG. 3, the SCC 300A includes an antenna 310, a network processing unit 312, a processing unit (processor, e.g., a microprocessor) 314, a vibrating motor or other generator of haptic feedback 318, a battery 320, and an external connection 322. During operation of the SCC 300A, the battery 320 can supply power to one or more of the antenna 310, the network processing unit 312, the processing unit 314, the cryptography unit 316, and the vibrating motor 318. The antenna 310 can be configured for wireless communication with one or more other SCCs and/or with one or more remote compute devices.

Software Implementation Details

In some embodiments, the SCC includes a peripheral input/output functional system for the user to interact with, which allows for proximity-based pseudo-random physical encounters through purposeful or ad-hoc wireless mediums of network connectivity. The SCC can be configured to dynamically create, maintain, monitor and/or terminate ad-hoc trusted wireless connections. Depending upon the implementation and/or desired design/architecture, the SCC wireless connections can operate in one-to-one, one-to-many, and many-to-many configurations.

In some embodiments, during use, when two or more SCCs are in physical proximity of each other, at least one of the SCCs will detect the proximity condition. In response to detecting the proximity and/or in response to detecting that a successful connection has occurred with another SCC and SCC-holder(s), that SCC can provide an indication or alert to the bearer of that SCC, e.g., by one or more of vibrating, illuminating (e.g., steady or flashing, colored or white light, etc.).

In some embodiments, communication-enabling software to implement 'ad-hoc' wireless connectivity between/among SCCs has one of two possible network control designs: a centralized control system with election, or a decentralized control system, for SCC to SCC (i.e., 1-to-1), SCC to one or more groups of SCCs (i.e., 1-to-many), or group(s) of SCCs to group(s) of SCCs (i.e., many-to-many) communications. The network communications may use Internet Protocol (IP) addressing, and may include reliable control protocols for data transmission, such as Transmission Control Protocol (TCP), or unreliable control protocols for data transmission, such as User Datagram Protocol (UDP). A function of the network control system is to maintain network topology, otherwise known as the arrangement of network-connected devices and their interconnected network paths to route and forward traffic. An example system that currently exists that has a network control system is the Internet.

In some embodiments, given a centralized control system design, the SCC may use one or more existing networking protocols such as Open Shortest Path First (OSPF), Enhanced Interior Gateway Routing Protocol (EIGRP), Routing Information Protocol (RIP), Border Gateway Protocol (BGP), or Intermediary-System to Intermediary-System (IS-IS) protocol, to establish network control system communications. In some such centralized control system designs, an SCC node can be designated, based on an election mechanism, as the manager of the routing and forwarding of information for connectivity within and/or between Smart Challenge Coin systems, for the 1-to-1, 1-to-many, and many-to-many forwarding states. In other embodiments, given a decentralized control system, the SCC may use a Recursive Intranetwork Architecture design.

1-to-1 or 1-to-Many Election in a Centralized Control System

Election mechanisms to choose the manager of routing and forwarding of information differ between the existing network protocols. For example, a Designated Router & Backup Designated Router can be used in the case of OSPF, and Successor and Feasible Successor can be used in the case of EIGRP. For BGP, a Route Reflector and backup Route Reflector, or a SCC node that maintains the network routing and forwarding topology using BGP, may be used. Any combination of the aforementioned election mechanisms may be used.

Election Tiebreaker:

In the event of a conflict during election, a tiebreaker system may be used. The tie-breaker system can utilize any of up to four (4) components/rules to break a tie:
1. Seniority based on relative time spent at the physical location where the ad-hoc network connection is attempting to take place.
2. Seniority based on number of active connections in proximity of that physical location where currently active network connections are not being terminated.
3. Seniority based on time powered on.
4. Seniority based on numerical identification.

An example of an election conflict in 1-to-1 connections can be illustrated by the following scenario:

1-to-1 Connection Example:
1. You are an SCC-holder at a coffee shop seated at a table, reading the morning news.
2. You have previously elected to participate in 1-to-1, and 1-to-Many communications.

3. You become aware that another SCC-holder is in this coffee shop, because the SCC in your pocket starts vibrating.
4. Prior to your becoming aware of the other SCC-holder, the SCCs were negotiating the managerial node role, and who will maintain a non-manager role.
5. Based on tie-breaker component/rule (1) above, because you were the first SCC-holder that maintained your location for a longer time, your SCC is elected as the manager and the second SCC will be a non-manager. After the negotiation, data signals to activate light and/or vibration can then be transmitted to your SCC and/or to the other SCC-holder's SCC, to signal to you, the user (and, optionally the other SCC-holder) that a connection has been made.
6. You physically locate the other SCC-holder by searching for him/her, and you consent to conversing with him/her for a period of time.
7. Result: 1-to-1 connectivity has been made; 1-to-1 communications have been established.

1-to-Many Connection Example:
1. Continuing the previous example, suppose you are conversing with the other SCC-holder when a third SCC-holder, who does not have any prior connections, arrives at this coffee shop and desires to connect to an existing ad-hoc communications system.
2. In this scenario, the SCC of the third SCC-holder (i.e., the third SCC) connects to the non-manager SCC (i.e., the second SCC) because those two SCCs were in closest proximity to one another.
3. Because your SCC (i.e., the first SCC) was previously elected as the manager for this particular ad-hoc communication, the second SCC will transmit a signal encoding information to the third SCC, the information including an indication that your SCC is the manager and should facilitate the connection.
4. The second SCC forwards the third SCC's information and request for connection to your SCC.
5. The first SCC (your SCC), accepts the request, and notifies the third SCC of acceptance.
6. The third SCC receives the notification, and the SCC manager (first SCC) and the new SCC (third SCC) are notified of a connection.
7. Result: 1-to-Many connectivity has been made; 1-to-Many communications have been established.

1-to-Many Tiebreaker Election Conflict Example:
1. Continuing the previous examples, assume that a second grouping of three SCCs arrives at your location (i.e., the location of the first group of SCCs that includes your SCC).
2. The SCCs of this second grouping of SCCs are designated as the fourth SCC, the fifth SCC, and the sixth SCC, where the fourth SCC is the manager of that cohort, and the fifth and sixth SCCs are non-managers.
3. Assume also that the second SCC Manager (the fourth SCC) has been powered on for the same amount of time (to the nanosecond) that your SCC has been powered on.
4. In this scenario, each of the tie-breaker components/rules (1)-(3) (i.e., the negotiation mechanisms based on seniority) are skipped, and instead the tie-breaker component/rule (4) is selected: the numerical identification which your SCC has been printed.
5. Because your SCC ID is "69" (e.g, because your SCC is the $69^{th}$ printed), whereas the fourth SCC ID is "420 (e.g., because it was the $420^{th}$ printed), you win this election tiebreaker, assume the SCC manager role, and assign a non-manager status to the fourth SCC, such that each of the fourth, fifth and sixth SCCs are non-managers.
6. Result: 1-to-Many connectivity has again been made; 1-to-Many communications have again been established.

Many to Many Communications Example:
In some embodiments, if the option of many-to-many communications is present, then an election negotiation different from the foregoing can take place. An initial election mechanism may still take place, however, the constraints and tiebreaker functionality are changed, as illustrated by the following example:
1. First, a specific size topology is programmed between 2-6 SCCs, as pre-configured local minimum and maximums of connectivity.
2. Second, the tiebreaker functionality skips immediately to tie-breaker component/rule (3) (time powered on), then (4) (numerical identification).

Taking the above example of 1-to-Many communications, assume the first group of three SCCs encounters the second group of three SCCs:
1. For many-to-many communications, the sharing of data and topology can occur without the involvement of the local SCC managers and without an election tiebreaker taking place.
2. Upon encountering an existing group of SCCs, individual SCCs may connect on their own without consent and coordination of the SCC managers.
3. With such a design, individual SCC connection data, optionally along with the associated group-SCC data, can be shared quickly.
4. Delays and other disadvantages of computing election tiebreakers before transmitting data can be reduced.
5. Result: a faster time to network convergence to pass traffic, and removal of barriers to instantaneous connectivity and data-sharing.

Change in Topology from Many-to-Many to 1-to-Many Example:
A many-to-many topology manager may elect to switch to a 1-to-Many network topology architecture as the manager of the system, or as a subordinate (non-manager). The purpose of the topology transition could be, for example, to disseminate information quickly from a leading manager of multiple managers (MOM), e.g., to reduce routing complexity, forwarding complexity, and network convergence times as networks grow.

In some embodiments, centralized network control systems are bounded by exponentially scaling Metcalfe's Law ($n^2$). Consequentially, the amount of time to achieve network convergence also scales, asymptotically proportional to Metcalfe's Law, ($n(n-1)/2$). Network convergence times can be reduced in the aforementioned network protocols by limiting broadcast domains, for example through Areas (e.g., in the case of OSPF), Autonomous Systems (e.g., in the case of EIGRP), or Autonomous System Numbers (ASNs) (e.g., in BGP).

A scale-free network protocol (SFNP) may be used to enable SCC hyperconnectivity. SFNP can eliminate the need to create limited broadcast domains such as Areas, or autonomous systems (Ass), and allow sub-second network convergence while a network may scale to hyperconnectedness.

In some known networks, such as the Internet, a specified 'best-path' is used for forwarding data, leaving all other paths non-utilized or underutilized. A network engineer must configure each application that wishes to use an alternative forwarding path manually, or through software-defined networking, e.g., semi-automatically through a Wide Area Network (WAN) enterprise. This is tedious, complex, and sub-optimal solution. In contrast with such approaches, and according to some embodiments set forth herein, a dynamic bandwidth multi-path forwarding (DBMPF) system may be used to enable SCC hyperforwarding. For example, in the foregoing example in which a transition from a Many-to-Many topology to a 1-to-Many topology has occurred, the SCC MOM may wish to utilize all existing wireless radio frequency paths to forward data. DBMPF will allow for maximum local utilization of all SCC connection links.

Ascertaining Time & Location

In some embodiments, the SCC utilizes network time protocol (NTP) to determine the current time with respect to Coordinated Universal Time (UTC). The SCC may also include an internal atomic clock to maintain time as a backup, in the event of a lack of availability of the NTP. The atomic clock may use a cesium atom or ytterbium atom to maintain precise time. The internal clock may also be an optical atomic clock made of strontium.

In some embodiments, the SCC utilizes a global positioning system (GPS) and/or a global navigation satellite system (GLONASS) to determine an accurate terrestrial position of the SCC. Alternatively or in addition, the SCC may utilize an inertial navigation system (INS) to determine precise geolocation of the SCC during movement in three-dimensional space, such as during aerial flight, spaceflight, or sub-maritime movement. The inertial navigation system may include one or more accelerometers and/or gyroscopes to capture motion, rotation and velocity.

In some embodiments, INS information is shared between SCC devices, via radio frequencies, for example to reduce the INS error-rate associated with INS calculation(s). INS error-rate reduction through relative reported position of other devices can be achieved, for example, using a Kalman filter, otherwise known as Linear Quadratic Estimation (LQE).

In some embodiments, Delay Tolerant Networking (DTN) protocols may be used for distant wireless communications, such as interplanetary communications. DTN can be used as part of interplanetary missions, for communications to satellites and interplanetary rovers, and is a methodology that ensures that data does not degrade when transmitted through extended free-space mediums for wireless radio frequency transmission.

In some embodiments, the chain of distribution of an SCC from its origin to a user/bearer (e.g., including one or more manufacturers, distributors, authorized partners, licensees, etc.) is monitored and/or managed to ensure a persistent chain of distributed trust can be accurately logged, measured, updated, and/or patched, for example to prevent bad-actors and untrusted entities from entering or otherwise accessing/observing the trusted network. The monitoring and/or management of the SCC chain of distribution can be accomplished, for example, by logging data (e.g., transaction data, event data, etc.) as immutable entries in a distributed ledger.

Immutability, Data Storage

In some embodiments, an immutable digital ledger may be used to maintain a record of transactional history and network connectivity history of one or more SCCs. The immutable ledger may use a proofing mechanism, such as the Election Tiebreaker Mechanism discussed above, e.g., using (1) relative positioning with respect to GPS, and (2) time with respect to Coordinated Universal Time. This digital ledger may operate in a manner that allows sharing and dissemination of portions of the immutable ledger through connectivity with SCCs. The immutable ledger may be stored in one or more data storage mediums, such as distributed blocks of network-attached storage (e.g., storage area networks, "SANs"), that the SCCs may connect to. The data storage mediums can be connected to existing mediums of data transfer and connectivity, such as the Internet, can include mechanical hard-drives (HDDs) and/or solid-state drives (SSDs), and can be organized, for example in a relational database design or a graph database design.

In some embodiments, computing and/or facilitating the immutable ledger proofing mechanism through the managerial tiebreaking mechanism may leave behind a digital receipt as a byproduct. This digital receipt may be commoditized in a manner such that performing tiebreaker calculations or many-to-many data sharing through facilitating the interaction between one or more SCC-holders, or performing the interaction as an SCC-holder for the purposes of therapeutic gain, begets an emergent value in relation to the process of calculation, verification, and interaction services.

In some embodiments, the SCC includes, or is part of, a distributed messaging system capable of performing zero-copy updates to facilitate synchronous and/or asynchronous updates of the distributed network topology at the lowest possible latency.

In some embodiments, the SCC includes or is operably and communicatively coupled to a database that stores records associated with or including packet routing and/or packet forwarding information. Such information can be used by the SCC to determine how to connect to one or more other SCCs, or to determine whether or not the one or more other SCCs have previously connected with the primary SCC. The database can include, for example, a list of known/trusted SCCs with which the subject SCC has previously established communications.

In some embodiments, the SCC includes or is operably and communicatively coupled to a transactional database that can act as an atomic ledger, and that can be synchronized through a transactional authority that maintains/manages the database.

In some embodiments, the SCC includes or uses a consensus mechanism known as Proof of Relative Time (PoRT) for achieving distributed consensus of who-connects-to-who first, and a proof of any transaction occurring. The implementation of PoRT allows a way for SCC connections to maintain structured order in scale, in a likely scenario that many SCC-holders are at a given physical location at the same time. PoRT consensus can be performed based on, or taking into account, the passage of real-time, relative to global positioning respective of occupancy in the physical world.

In some cases, an SCC holder who has been located in the given physical location for the longest period of time (referred to herein as 'camping' or 'squatting') may, in some implementations, have a better chance of connecting to another SCC. To deter campers and squatters, a pseudo-random integer can be constructed and injected into the PoRT consensus algorithm such that the likelihood of connecting is decreased if a habitual pattern of abuse of a physical location (i.e., camping or squatting) with respect to time is observed and deemed unfavorable.

In some embodiments, the SCC can nullify, terminate and/or reject connections. Internal software functions of an SCC can be described in pseudo-code, for example as shown in Appendices A and B.

Pseudo-randomness is sometimes defined as a stochastic process, but that is not always the case when viewed in practical terms. Human movement, for example, is pseudo-random. As such, pseudo-random connectedness can be a significant factor in facilitating SCC connections and encounters that may rely, conceptually, on chance. For example, the sporadic ad-hoc connectivity of the SCC (e.g., pseudo-random, or appearing to be random) occurring throughout the day as a user performs his/her daily activities can reduce the monotony of the user's daily activities and evoke a feeling (e.g., 'luck', or 'joy') within the user. In some implementations, the SCC is configured (either by virtue of an onboard processor and processor-executable instructions stored in a memory accessible by the processor, or as a result of wireless communications with a remote compute device) to perform a method including operating according to a schedule that preserves the feeling of pseudo-randomness and/or that serves to remind the SCC holder to carry their coin.

In some embodiments, an SCC system does not make connections via, or 'peer' to, the public Internet.

Figure 4:
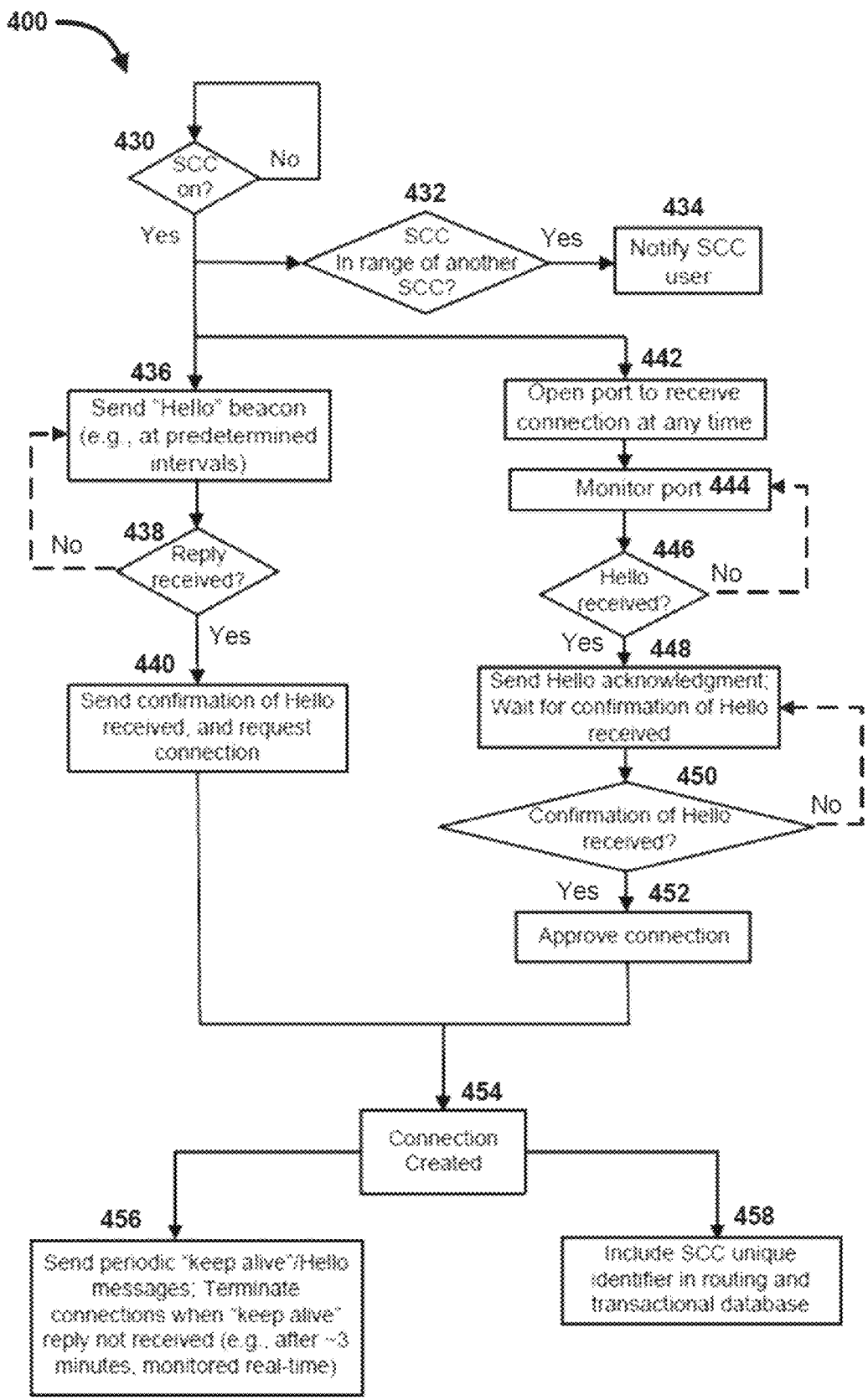
FIG. 4 is a diagram showing ad-hoc networking between two SCCs, according to some embodiments.

FIG. 4 is a diagram showing ad hoc networking between two SCCs, according to some embodiments. As shown in FIG. 4, during the ad hoc networking process 400, if at 430 the first SCC is determined to be powered on and, at 432, determined to be in range of a second SCC, the user/bearer of the first SCC is notified at 434. Also, when the first SCC is on, the first SCC can send a "Hello" beacon signal, at 436, for example once or multiple times over a series of time intervals (e.g., at a predetermined interval or frequency of occurrence). If a reply to the Hello beacon is determined, at 438, to have been received by the first SCC from a second SCC, the first SCC can send a "confirmation of Hello received" signal, at 440, to the second (replying) SCC, and request (either in the same or in a subsequent communication) to establish a connection (i.e., a communications link) with the second SCC. Alternatively, if a reply to the Hello beacon is determined, at 438, not to have been received by the first SCC, the ad hoc networking process 400 can optionally loop back to the first SCC again sending a Hello beacon (436). Complimentarily to the foregoing, when the second SCC is turned on, the second SCC can open a port to receive a connection (e.g., at any time). If the second SCC detects the Hello beacon, the second SCC can send a Hello acknowledgment signal (i.e., a "confirmation of Hello received" message) and wait for confirmation or acknowledgment of the Hello received message. Concurrently or subsequently (e.g., upon receipt of the confirmation or acknowledgment of the Hello received message), the second SCC can approve the first SCC's request to establish a connection. Similar to the foregoing process described for the second SCC, the first SCC can also open a port, at 442, to receive a communication, and monitors that port 444. If the first SCC detects, at 446, a Hello beacon, the first SCC can send a Hello acknowledgment signal (i.e., a "confirmation of Hello received" message) at 448 and wait for confirmation or acknowledgment of the Hello received message. If, at 450, a confirmation of the Hello message is received, the first SCC can approve, at 452, the received request to establish a connection. Alternatively, if at 450, a confirmation of the Hello message is not determined to have been received, the ad hoc networking process 400 can optionally loop back to sending another Hello acknowledgment message and/or continue waiting for confirmation (448).

Upon completion of the foregoing actions on the part of both SCCs, a connection is created at 454. The SCC can then send, at 456, periodic "keep alive" Hello messages to the other SCC. Optionally, the SCC can terminate its connection with the other SCC when no reply is received to a "keep alive" message, for example after a predetermined wait period (e.g., ~3 minutes, real-time). As noted at 458, the SCC can include (e.g., in memory, for example in a routing and transactional database) an SCC unique identifier.

Time-to-Notification Enhancement

In some embodiments, an SCC system includes a logical network that extends by granular consent to an individual's Personal Area Network (PAN), and connects to specific authorized LAN/WAN networks. Known partial-mesh network topologies, network function virtualization methods, software-defined networks, and networking convergence protocols such as Open Shortest Path First (OSPF), Enhanced Interior Gateway Routing Protocol (EIGRP), and Border Gateway Protocol (BGP) often exhibit unacceptably slow network convergence times, for example due to the hyper-connected nature of many modern systems and the myriad devices that are currently being connected to the Internet (i.e., the Internet of Things (IoT)).

SCC systems of the present disclosure can dynamically allocate a distribution of bandwidth as new connections are established in the network, without manual configuration, for the prevention of bandwidth starvation and underutilization of alternative links, and the reduction of network complexity for network engineers. Under known schemes, if there are two or more network paths to get to a particular destination, by default the lowest-weight or 'best path' will be selected as the primary link forward (see FIG. 5). The secondary (or tertiary, quaternary, etc.) links will never be utilized, unless manually configured. Network solutions set forth herein (see, e.g., FIG. 6) can dynamically allocate data such that it flows through newly-established links, to distribute bandwidth loads and reduce operational complexity. As used herein, control data is the logical set of instructions for directing a data packet, and for instructing an SCC how to connect to another SCC.

Figure 5:
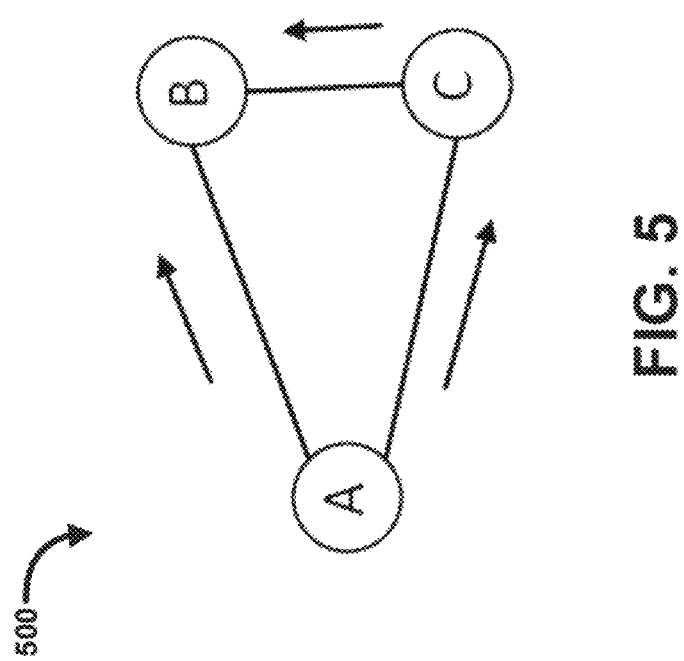
FIGS. 5-6 are diagrams illustrating the implementation of best-path selective routing in networking, according to some embodiments.
Figure 6:
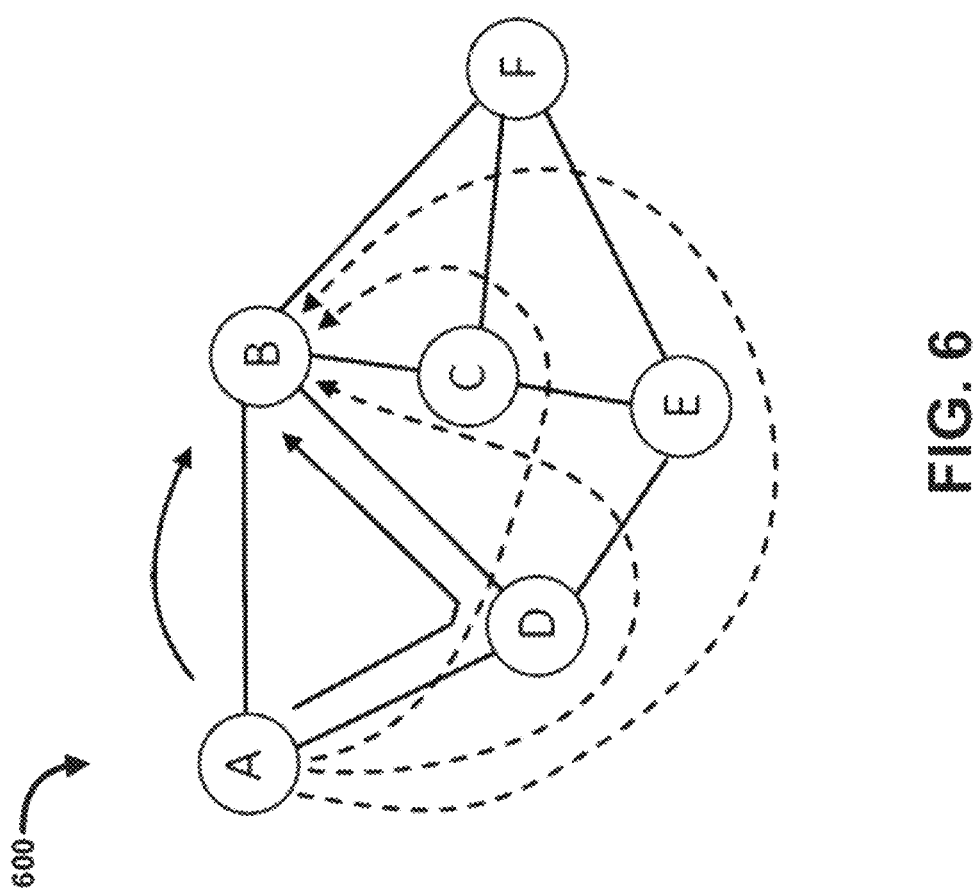

Referring to FIG. 5, there are two paths for data to travels from router A to router B: (1) directly from A to B, and (2) from A to router C, then to B. A potential problem with this is that, unless manually configured, data will travel only through the path that corresponds with or adheres to the best-path metric (in this case, path (1)). This is acceptable for some applications, where an objective is to avoid sub-optimal routing (e.g., via path (2)) to a destination. When path (1) is over-subscribed, however, bandwidth may be unavailable on path (1). In such scenarios, a network engineer may configure unequal-cost-multipath to allow some transactional connections to be established over an alternate link (e.g., C to B). This is a manual process that does not scale. FIG. 6, by contrast, shows five ways for data traffic to travel from router A to router B ((1) A directly to B, (2) A to D to B, (3) A-D-E-C-B, (4) A-D-E-F-B, and (5) A-D-E-C-F-B). As such, even where the "primary link" (path (1)) is over-utilized, other paths are available without the need for manual reconfiguring.

In some embodiments, an SCC has a capacity to hold $2^n$ full-mesh connections, where n=150. Full-mesh connections are connections in which, at any given time, an individual SCC will have complete knowledge of the available network routing options to other SCCs, and the SCC-holder may connect to the SCC bearers associated with those other SCCs without the use of a centralized device (such as a route reflector) acting as a focal point for routing of control data, and without the use of resource-intensive network convergence processes.

As used herein, a "network convergence process" refers to a mechanism in which each participant in a network, or nodes, computes a set of instructions, or routing protocols, to create a logically similar map of the interconnected network between the nodes, and is considered the stable state of the network. Many of the aforementioned dynamic routing protocols (OSPF, EIGRP, BGP), as well as some protocols not mentioned above (Routing Information Protocol, RIP), compute the best available path between devices using their own unique algorithms and computational state machines.

The number 150 is related to Dunbar's number—the cognitive limit (as theorized by Robin Dunbar) to the number of people with whom a human can maintain a stable social relationship with. In some embodiments, where an excess of 150 connections is detected, a full-mesh 'pruning' may be performed, one or more personal connections may be eliminated or terminated, and/or signifying information of the subject SCC/end-device may be otherwise retained, while reducing network routing connectivity knowledge to partial-mesh.

Metcalfe's Law states the effect of a telecommunications network is proportional to the square of the number of connected users of the system ($n^2$). Qubit networking allows the size of the abstract vector in Hilbert space to scale with the same dimensions) of computational processing power. In some embodiments, an SCC system includes or interfaces with a quantum computer network system, and adding a qubit to the quantum computer network system can increase (e.g., double) the space ($n^2$) and/or increase (e.g., double) the computing power.

In some embodiments, an SCC includes proximity sensor that relies on a wireless communication frequency (WiFi, Bluetooth, licensed or unlicensed spectrum), a feedback generator that notifies a user (e.g., vibration, haptic feedback, LED) to signify that another user nearby also has an SCC. In some embodiments, SCC can be "minted" and distributed in batches such that, for example, a VFW SCC can only communicate with other VFW SCCs. In some embodiments, the SCC can get updates via wireless communications. In some embodiments, the SCC can be charged/recharged via wireless charging, or additionally or alternative, utilize a single use battery. In some embodiments the SCC can be configured to connect to a user's phone, and/or application "app". In some embodiments, the SCC can be configured to use such connections to identify another holder of a corresponding SCC. In some embodiments, the SCC can be configured to connect to other SCCs having a corresponding or same pre-built key; in some embodiments, the key is hardware, while additionally or alternatively, the key or a key is software.

While some embodiments utilize connections that are implemented using partial mesh due to traffic management consideration. Other embodiments can be configured with full mesh networks, where lookups are not required.

In some embodiments, devices ("battle stations") can be provided to enhance SCCs, and placed across geographic regions (e.g., STARBUCKS, bars, concert venues, etc.) to provide small points of presence ("POPs") in a distributed manner; such devices can be configured to send out a much stronger/longer signal, with low power draw.

In some embodiments, the SCC can be configured to address adversarial threats, for example, participants/users can be filtered out, and/or at the software level and/or hardware level (e.g., crypto, distributed ledger technology, etc.). in some embodiments, the SCC can be used to securely track beneficial/approved activities, such as tracking therapy visits, exercise, etc.

Figure 7:
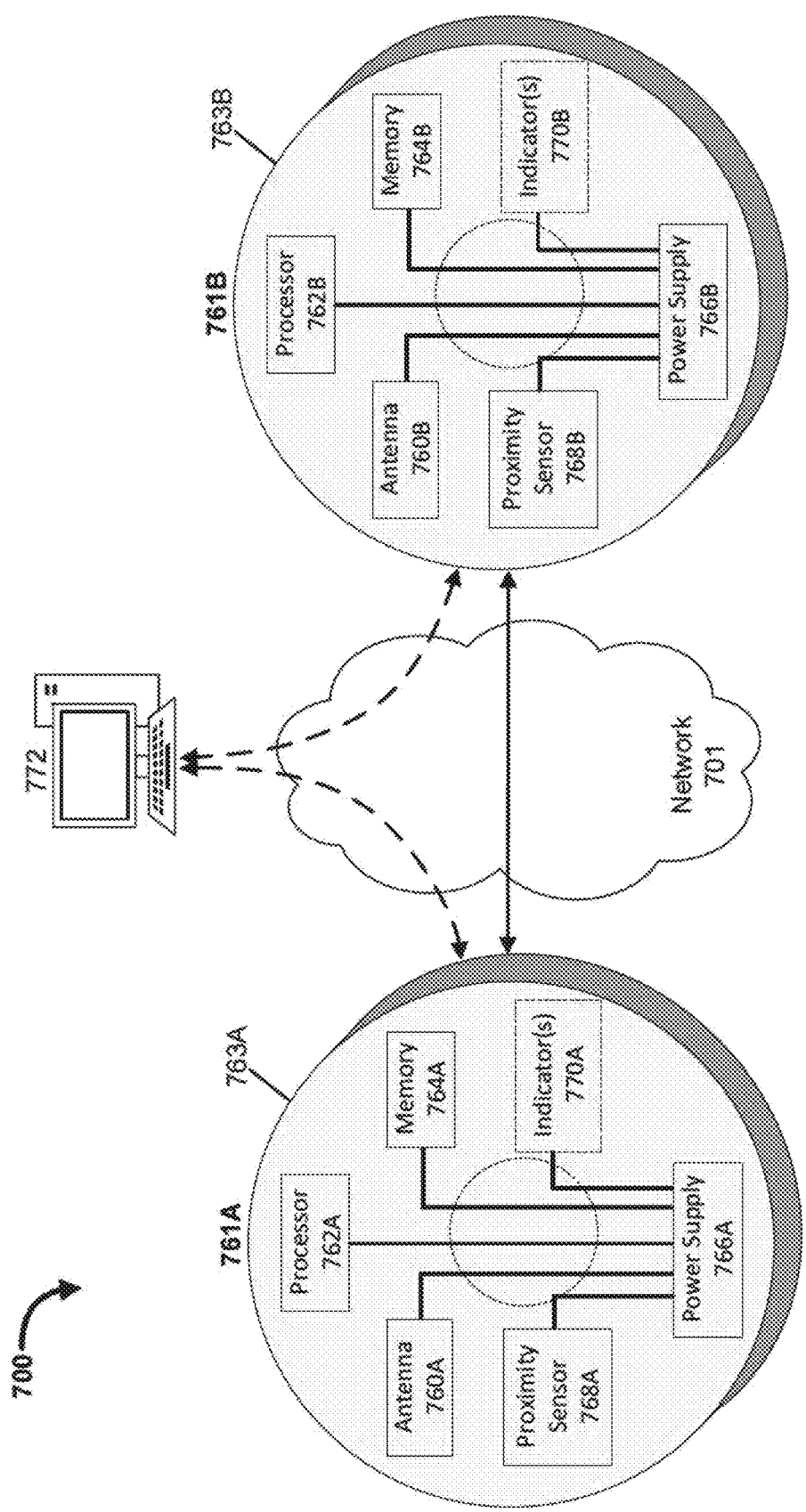
FIG. 7 is a diagram showing a system for SCC communications, according to some embodiments.

FIG. 7 is a diagram showing a system for SCC communications, according to some embodiments. As shown in FIG. 7, the system 700 includes two SCCs (761A and 761B), the SCCs being handheld coin-shaped apparatuses. SCC 761A includes an antenna 760A (or other communications interface(s)), a processor 762A, a memory 764A, a power supply 766A, a proximity sensor 768A (e.g., that utilizes a wireless communication frequency), a housing 763A, and optionally one or more indicators 770A. The power supply 766A is electrically coupled to, and configured to supply power, during use, to each of the antenna 760A, processor 762A, proximity sensor 768A, and optional one or more indicators 770A. The memory 764A can store one or more identifiers associated with the SCC 761A (e.g., a manufacturing sequence number or other unique identifier) and other data such as identifiers associated with other known SCCs, connection history, user/owner data, affiliated organization data, etc. The memory 764A can also store processor-readable instructions that can be used by the processor 762A to perform tasks and functions, such as the methods shown and described with reference to FIGS. 4, 8 and 9.

Similarly, SCC 761B includes an antenna 760B (or other communications interface(s)), a processor 762B, a memory 764B, a power supply 766B, a proximity sensor 768B (e.g., that utilizes a wireless communication frequency), a housing 763B, and optionally one or more indicators 770B. The power supply 766B is electrically coupled to, and configured to supply power, during use, to each of the antenna 760B, processor 762B, proximity sensor 768B, and optional one or more indicators 770B. The memory 764B can store one or more identifiers associated with the SCC 761B (e.g., a manufacturing sequence number or other unique identifier) and other data such as identifiers associated with other known SCCs, connection history, user/owner data, affiliated organization data, etc. The memory 764B can also store processor-readable instructions that can be used by the processor 762B to perform tasks and functions, such as the methods shown and described with reference to FIGS. 4, 8 and 9.

The system 700 can also include one or more remote compute devices 772, and each of SCC 761A and SCC 761B can be configured to communicate (e.g., via their respective antennas 760A/760B and via network 701) with the one or more remote compute devices 772, for example to retrieve data (e.g., identifiers associated with the SCC 761A and/or SCC 761B, identifiers associated with other known SCCs, connection history data, user/owner data, affiliated organization data, etc.) and/or processor instructions. The SCC 761A is configured to respond to the SCC 761B when the SCC 761A and the SCC 761B are within a predetermined range of each other. Each of SCC 761A and SCC 761B can have its own network function capability such that the underlying network connectivity between the first handheld coin-shaped apparatus and the second handheld coin-shaped apparatus (e.g., via wireless network 701) does not rely on internet peering, mobile data, or cellular service connection.

Figure 8:
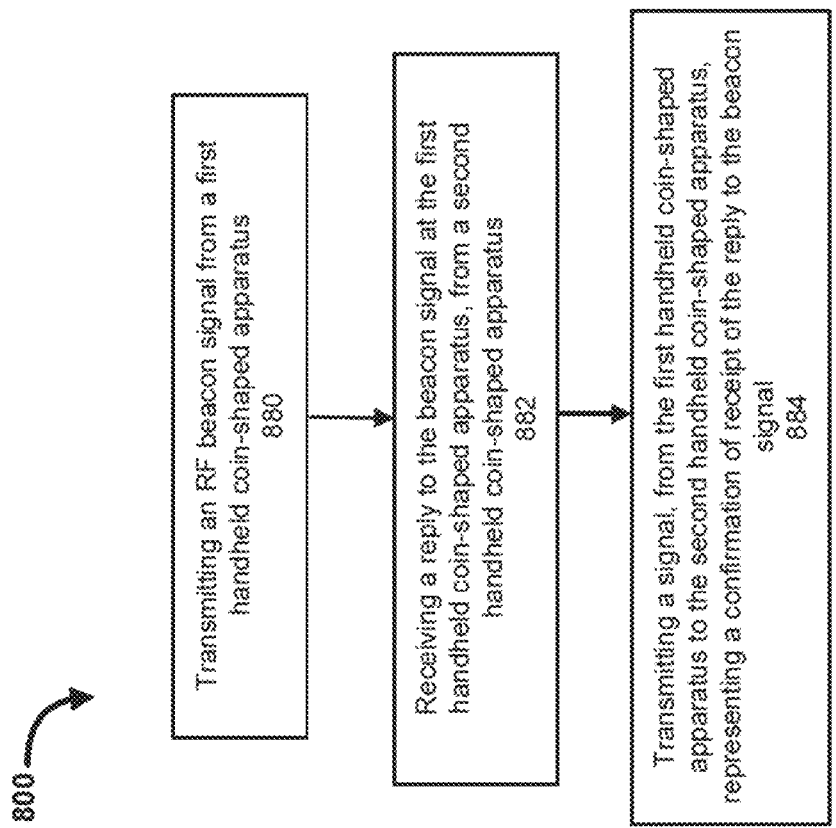
FIG. 8 is a flow diagram illustrating a first method for establishing communications between SCCs, according to some embodiments.

FIG. 8 is a flow diagram illustrating a first method for establishing communications between SCCs, according to some embodiments. As shown in FIG. 8, the method 800 includes transmitting, at 880 and from a first handheld coin-shaped apparatus, a radio frequency beacon signal. The method 800 also includes receiving, at the first handheld coin-shaped apparatus and from a second handheld coin-shaped apparatus, a reply to the beacon signal at 882. The method 800 also includes transmitting, from the first handheld coin-shaped apparatus and to the second handheld coin-shaped apparatus, and in response to receiving the reply to the beacon signal, a signal representing a confirmation of receipt of the reply to the beacon signal at 884, thereby establishing a communications connection between the first handheld coin-shaped apparatus and the second handheld coin-shaped apparatus. Although not shown in FIG. 8, the method 800 optionally also includes transmitting a keepalive signal from the first handheld coin-shaped apparatus to the second handheld coin-shaped apparatus. The transmitting the keepalive signal can be performed periodically, at predetermined time intervals. Alternatively or in addition, the method 800 optionally also includes terminating the communications connection between the first handheld coin-shaped apparatus and the second handheld coin-shaped apparatus if a reply to the keepalive signal is not received within a predefined time period of the transmission of the keepalive signal.

Figure 9:
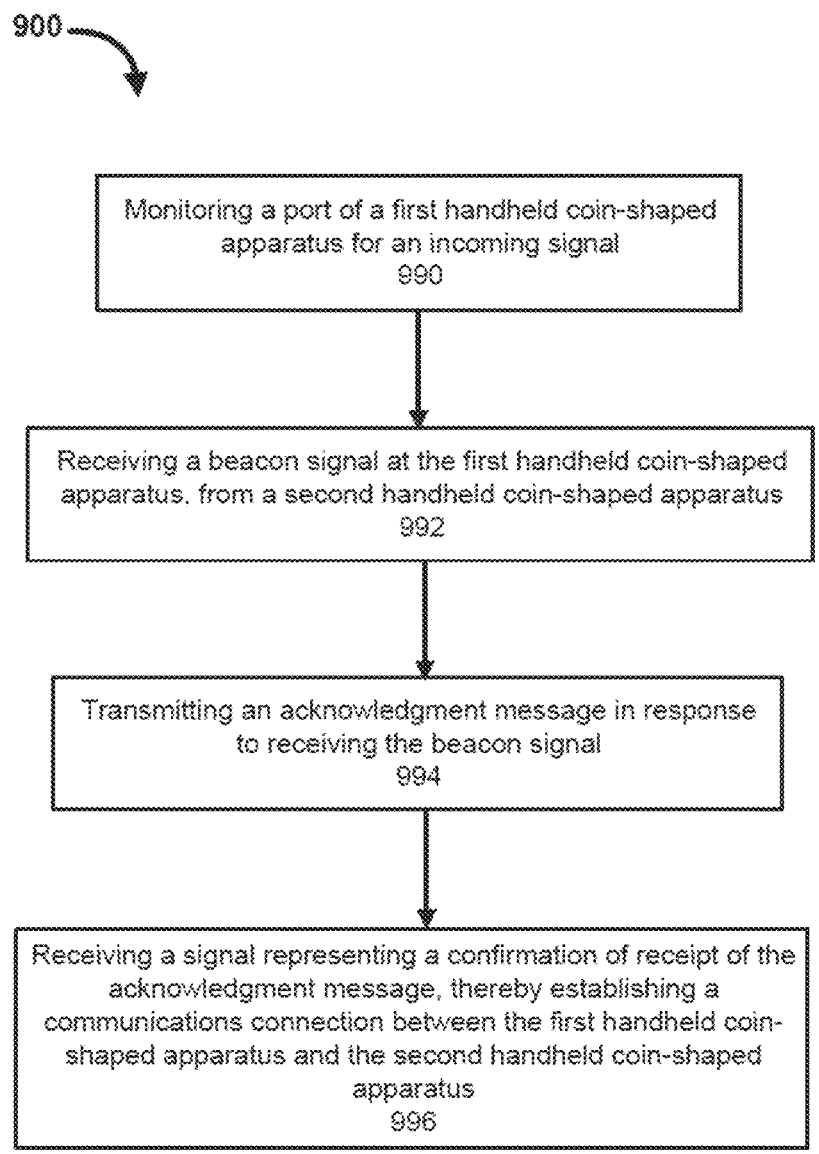
FIG. 9 is a flow diagram illustrating a second method for establishing communications between SCCs, according to some embodiments.

FIG. 9 is a flow diagram illustrating a second method for establishing communications between SCCs, according to some embodiments. As shown in FIG. 9, the method 900 includes monitoring, at 990 and at a first handheld coin-shaped apparatus, a port of the first handheld coin-shaped apparatus for an incoming signal. The method 900 also includes receiving, at the first handheld coin-shaped apparatus and from a second handheld coin-shaped apparatus, a beacon signal at 992. The method 900 also includes transmitting, from the first handheld coin-shaped apparatus and to the second handheld coin-shaped apparatus, an acknowledgment message in response to receiving the beacon signal at 994. The method 900 also includes receiving, at the first handheld coin-shaped apparatus and from the second handheld coin-shaped apparatus, a signal representing a confirmation of receipt of the acknowledgment message, at 996, thereby establishing a communications connection between the first handheld coin-shaped apparatus and the second handheld coin-shaped apparatus.

Figure 10:
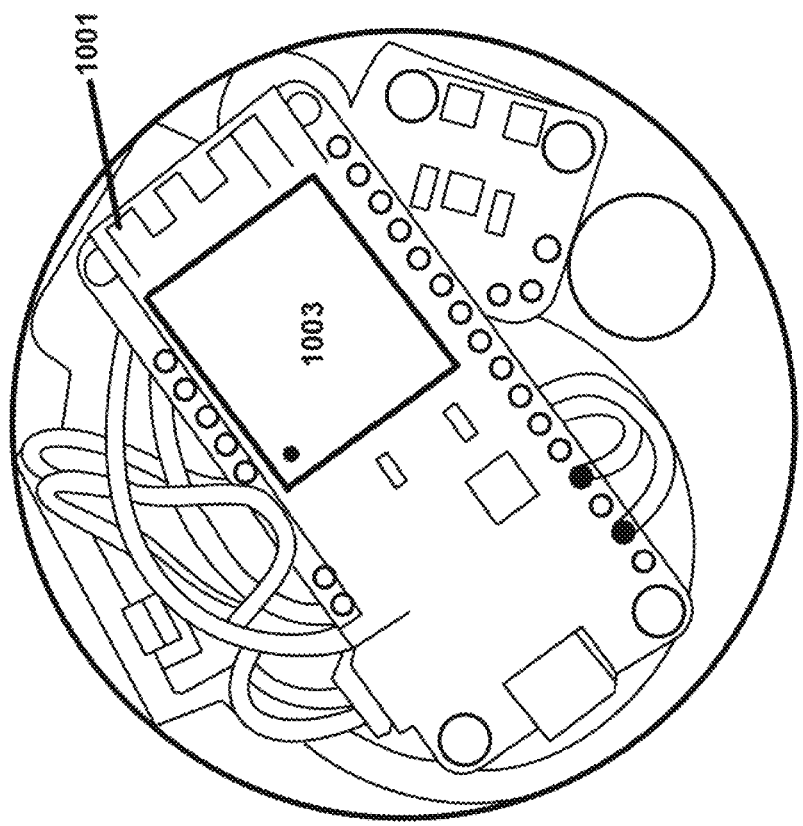
FIGS. 10-13 are photographic views of example SCC components, according to some embodiments.
Figure 12:
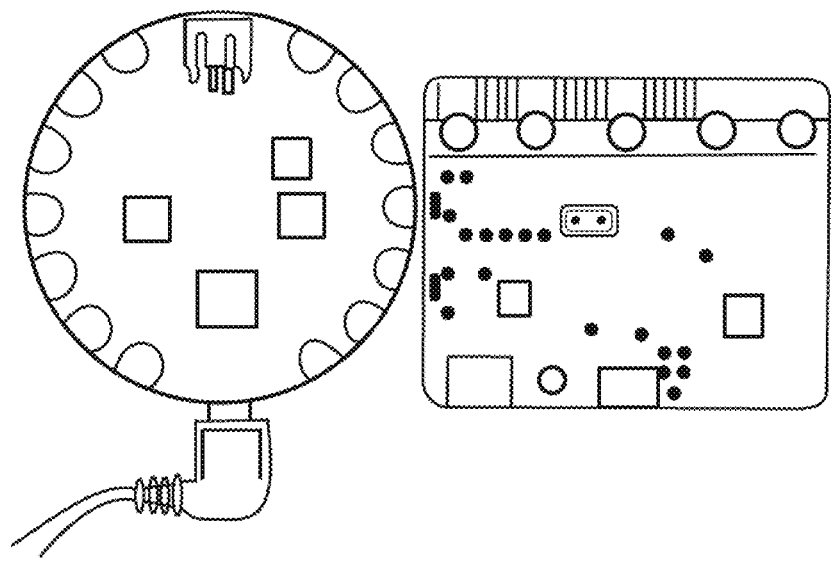
Figure 11:
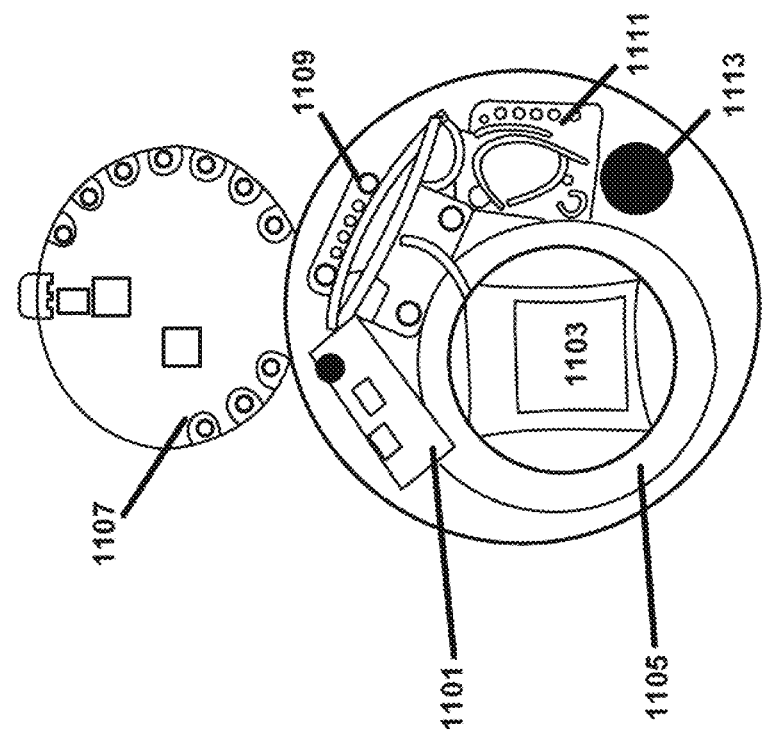
Figure 13:
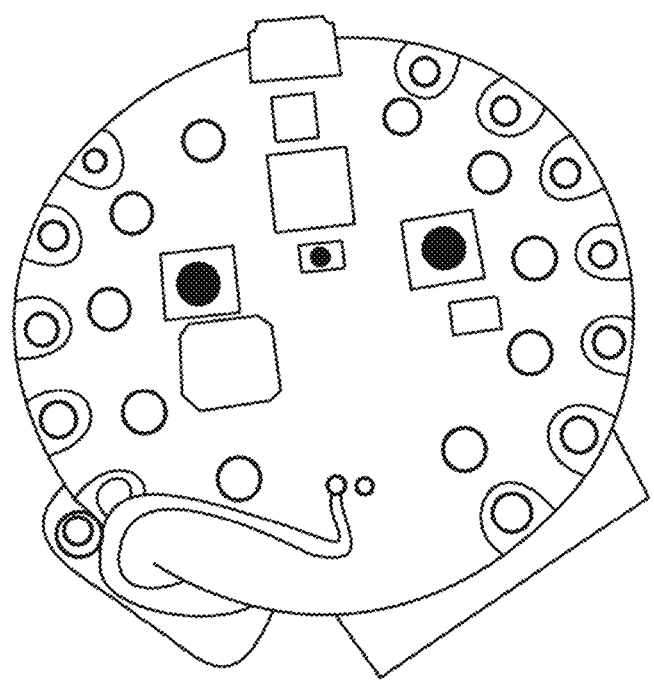
Figure 14A:
FIGS. 14A-14C are exterior views of example SCCs, according to some embodiments.
Figure 14B:
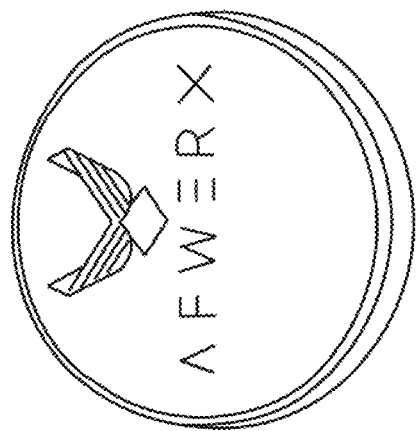
Figure 14C:
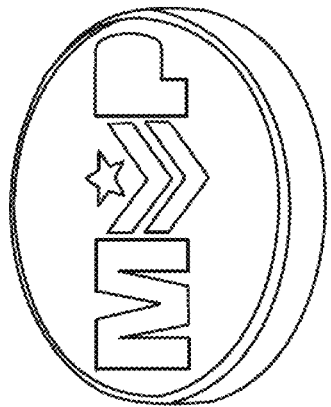
Figure 16:
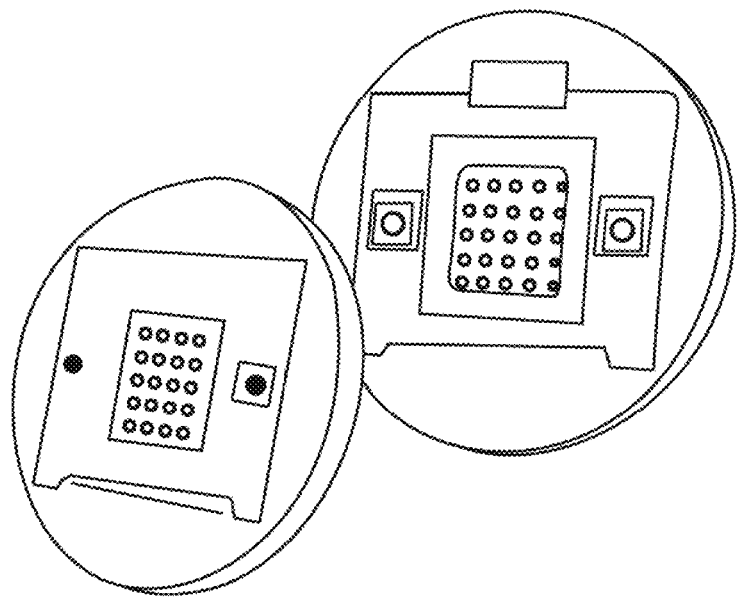
FIG. 16 is a photograph showing interior views of example SCCs, according to some embodiments.
Figure 15:
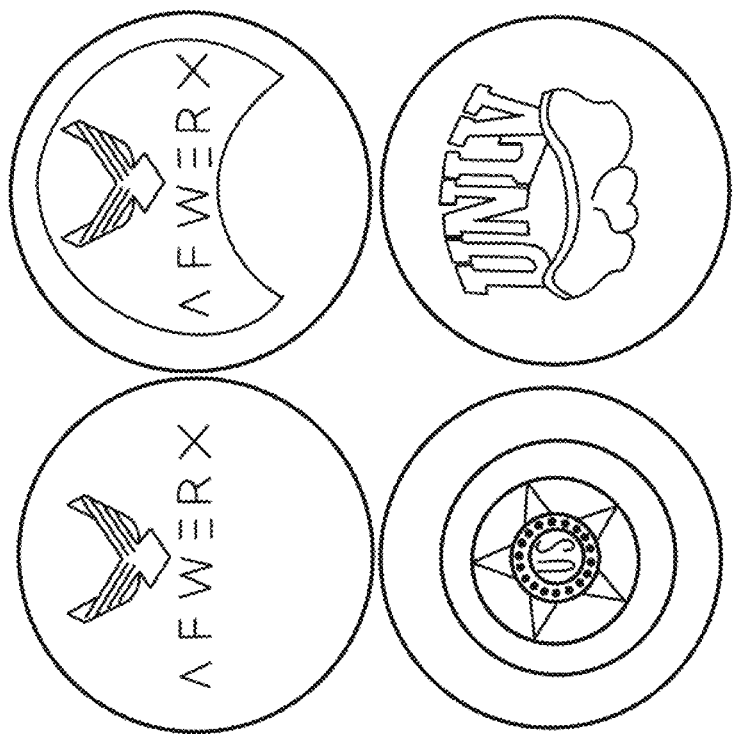
FIG. 15 is a photograph showing multiple different example molds for use in applying visual patterns/designs to SCCs, according to some embodiments.
Figure 17:
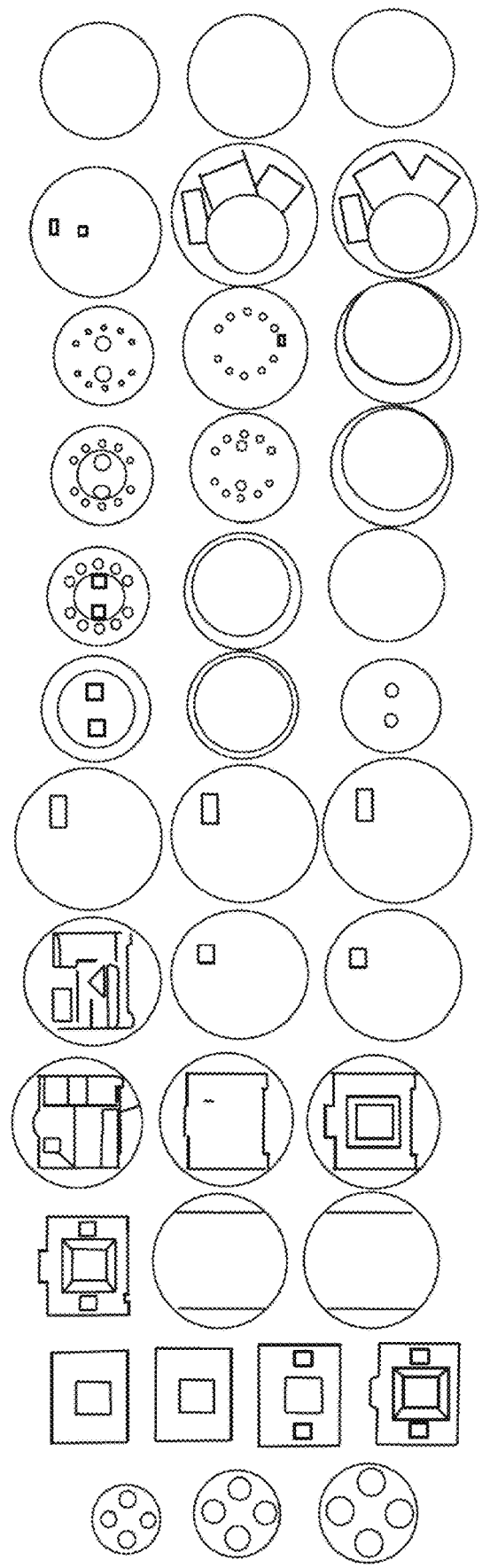
FIG. 17 is a photograph showing arrays of components used in assembling SCCs, according to some embodiments.

FIGS. 10-13 are photographic views of example SCC components, according to some embodiments. The interior view of FIG. 10 shows example locations of an antenna 1001 and a system-on-a-chip (SoC) component 1003. The SoC can include one or more of: central computing functions, chip-enabled cryptography, a real-time operating system (OS), or an access-point/station/mesh networking system. The interior view of FIG. 11 shows example locations of a wireless charging regulator 1101, a lithium-polymer (Li-Po) battery 1103, an inductive charging coil 1105, a microprocessor 1107, a battery regulator 1109, a haptic motor controller 1111, and a haptic motor 1113. The view of FIG. 12 shows example printed circuit boards (PCBs) that can be used for microprocessing with an SCC. Such PCBs can include one or more of: a central processing unit (CPU), one or more LEDs, wireless frequency (e.g., radio frequency (RF)) capability, and programmable logic. FIG. 13 is a photograph of an interior view of pre-assembly SCC including multiple LEDS, of different colors, each in an illuminated state. FIGS. 14A-14C are exterior views of example SCCs, according to some embodiments. FIG. 15 is a photograph showing multiple different example molds for use in applying visual patterns/designs to SCCs, according to some embodiments. FIG. 16 is a photograph showing an SCC charging station, according to some embodiments. FIG. 17 is a photograph showing arrays of components used in assembling SCCs, according to some embodiments.

Figure 18:
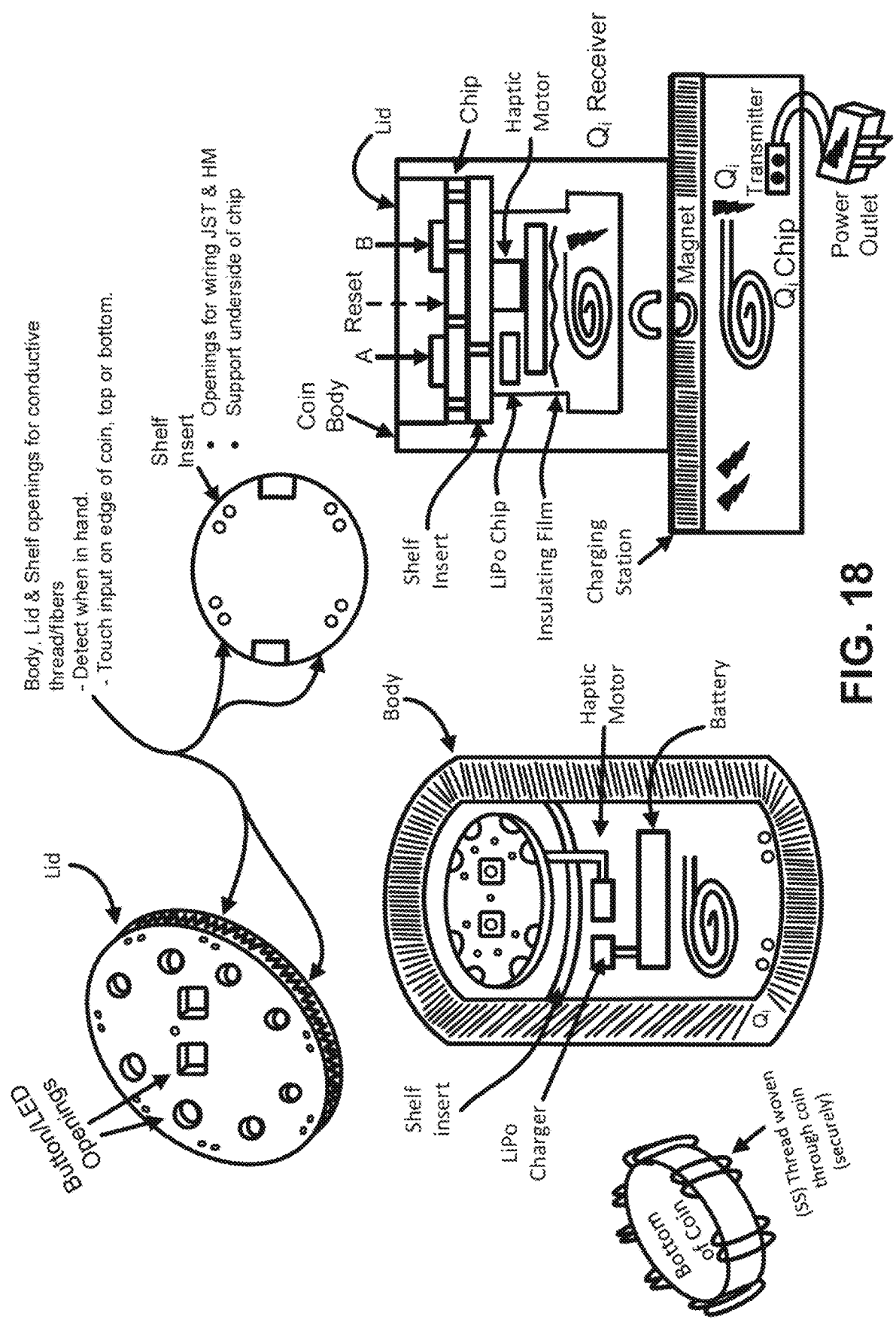
FIG. 18 is a diagram showing example assembly instructions for an SCC, according to some embodiments.

FIG. 18 is a diagram showing example assembly instructions for an SCC, according to some embodiments. As shown in FIG. 18, the components of an SCC can include a lid, a body, a chip (e.g., a microprocessor chip), a shelf insert, a haptic motor, a charger (e.g., a Li-Po chip), an insulating film, a Qi receiver, and a battery. Each of the body, the lid, and the shelf insert can include multiple openings through which one or more LEDs and/or buttons can be accessed and/or through which conductive thread, fibers and/or wires can be positioned, when the SCC is assembled. The assembled SCC can be configured to detect when it is disposed in the hand of a user, e.g., via a touch/tactile input on the edge, top and/or bottom of the SCC. Each of the chip, the shelf insert, the haptic motor, the charger, and the battery is disposed within the body. Also shown in FIG. 18 is an SCC charging station, which includes a Qi chip, a Qi transmitter (which, during operation, can communicate with the Qi receiver of the SCC), and a power cord/cable for connection to a power source such as a wall power outlet.

Figure 19:
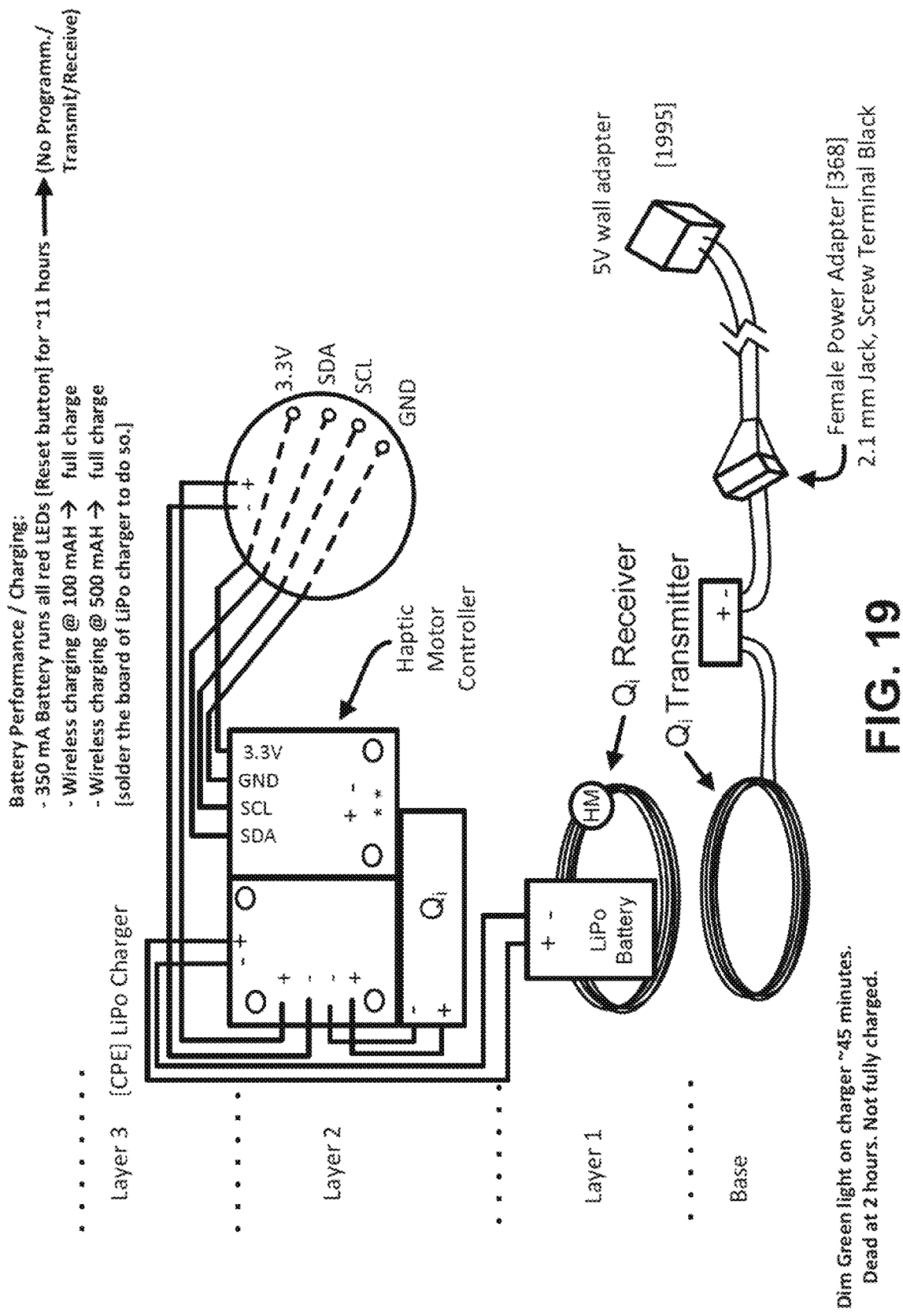
FIGS. 19-20 are diagrams showing an example charging station for an SCC, according to some embodiments.
Figure 20:
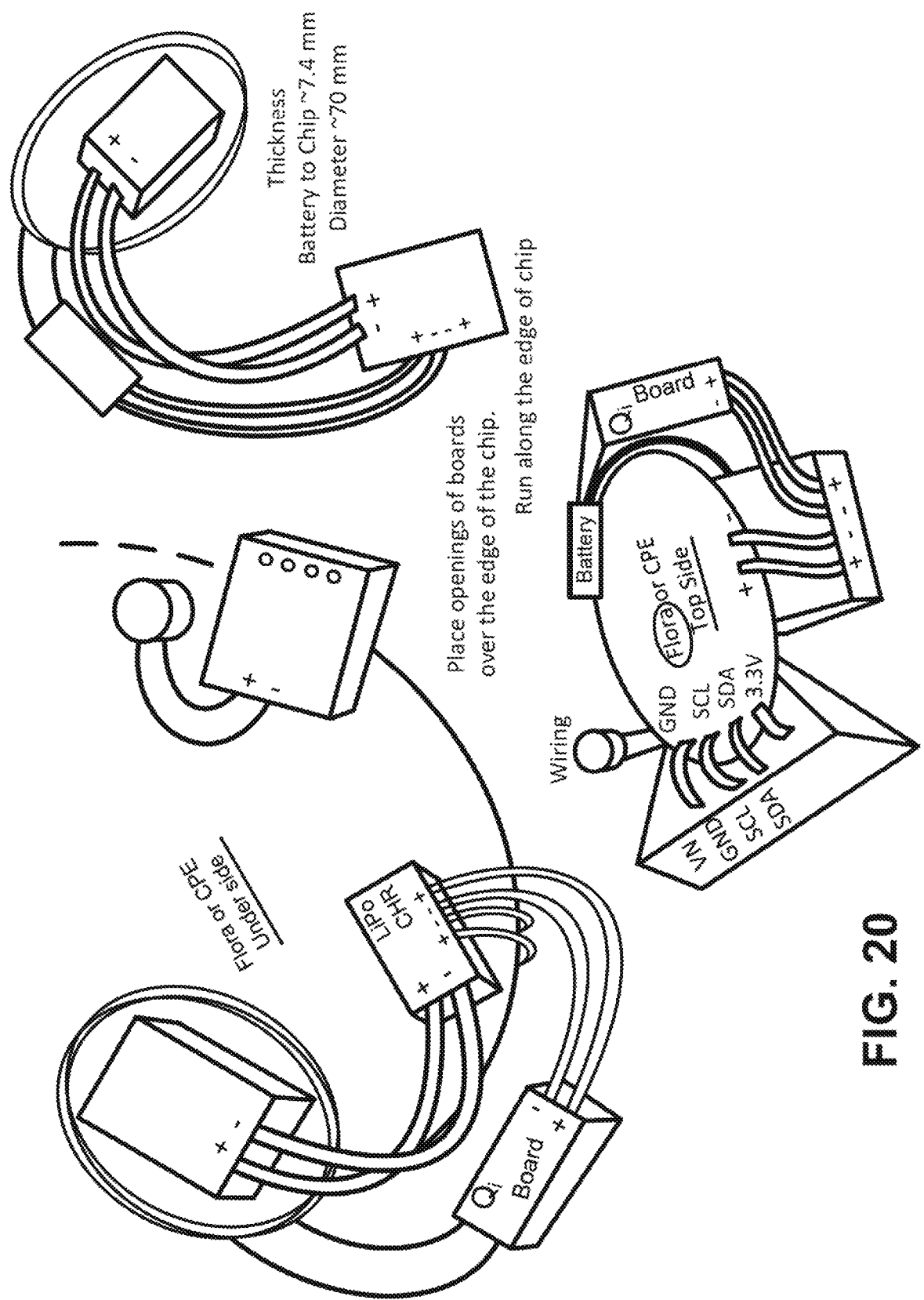

FIGS. 19-20 are diagrams showing an example charging station for an SCC, according to some embodiments. As shown in FIG. 19, a 350 mA battery can supply power to multiple red LEDs for about 11 hours, and wireless charging of the SCC can be performed at 100 mAh or at 500 mAh. The SCC in FIG. 19 is rendered in an exploded view, to show the layered relationship between the Li-Po charging chip (Li-Po charger; Layer 3), the haptic motor controller (Layer 2), the Li-Po battery (Layer 1), and the Qi receiver (Layer 1). FIG. 19 also shows the wiring/interconnections between terminals of the Li-Po charger, the haptic motor controller, the Li-Po battery, and the Qi receiver and the 3.3V, SDA, SCL and GND terminals of the SCC. The charging base (labelled "Base" in FIG. 19) is configured (e.g., sized and/or shaped) to interface with and electrically connect to the SCC when the SCC in emplaced thereon, for example via the 3.3V, SDA, SCL and GND terminals of the SCC. In other words, in some embodiments, the SCC charger base include complementary terminals 3.3V, SDA, SCL and GND. The charging base is connected to a cable/wiring that terminates at a 5V wall adapter and includes a female power adapter with a 2.1 mm jack and a screw terminal block. In some embodiments, when a dim green light is illuminated on the Li-Po charger of the SCC, it indicates that the SCC will function for another approximately 45 minutes before running out of power. FIG. 20 shows the proper placement of the SCC on the charging base, according to some embodiments.

Smart Challenge Coin Use Cases:
Verification Authenticity

The Smart Challenge Coin may be used to verify the authenticity of an individual through the immutable ledger and an SCC Identification system:

A forward intelligence operative who requires clandestine connectivity to a remote contact (e.g., behind enemy lines) may use an SCC for additional protection and verification.

A police officer stopping a vehicle in the middle of the night may have reduced anxiety when approaching an unknown driver if, as indicated via their respective SCCs, they are known to have served together in military service.

A whistleblower may use an SCC to connect to a trusted law enforcement agent or civic servant for individual protection.

Therapeutic Gain

Examples of Smart Challenge Coin therapeutic gain may include, but are not limited to, 1. Suicide prevention, e.g., by transmitting an emergency or non-emergency crisis beacon to find a local support group.
2. Camaraderie facilitation through association and attachment of subculture and metaculture references.

3. Romantic relationship creation through proximity-based mutual attraction and topic-modeled association.
4. Reduction of paranoia and mania through a tangible device that provides intermittent haptic reminders of grounding within the physical world.
5. Absolution of guilt and embarrassment for socially-anxious, self-isolated individuals through a medium of connectivity, as a gateway to a hyperconnected community without the need for the individual's physical attendance.

Although SCCs are shown and described herein as representing membership in a military organization, SCC can alternatively represent other affiliations (e.g., membership in alcoholics anonymous (AA), narcotics anonymous (NA), etc.) such that members of those organizations can locate each other, when desired.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. An apparatus, comprising:
a substantially cylindrical housing including a rotatable portion;
a power source disposed within the housing;
a processor disposed within the housing and electrically coupled to the power source;
a communications interface disposed one of within or on an exterior of the housing and electrically coupled to the power source; and
an indicator disposed at least partially within the housing,
the processor configured, during operation, to execute instructions to:
detect the presence of a functionalized coin within a predefined distance of the apparatus; and
in response to detecting the presence of the functionalized coin within the predefined distance, causing a supply of power from the power source to the indicator to cause the indicator to exhibit an indication,
the apparatus configured to control the supply of power from the power source in response to a rotation of the rotatable portion; and
the apparatus having a thickness of less than 7 millimeters and sized to fit within a palm of a human user.

2. The apparatus of claim 1, wherein the indicator includes at least one of a piezoelectric motor or a haptic motor.

3. The apparatus of claim 2, wherein the haptic motor includes an internal vibrating disc.

4. The apparatus of claim 2, wherein the indication is a physical vibration.

5. The apparatus of claim 1, wherein the indicator includes at least one light-emitting diode (LED).

6. The apparatus of claim 5, wherein the indication is an emission of light.

7. The apparatus of claim 1, further comprising a memory storing the instructions.

8. The apparatus of claim 1, wherein the communications interface includes at least one antenna.

9. The apparatus of claim 8, wherein the apparatus is configured to wirelessly communicate with a remote compute device, via the at least one antenna.

10. The apparatus of claim 9, wherein the instructions are retrieved from the remote compute device via wireless communication between the apparatus and the remote compute device.

11. The apparatus of claim 1, wherein the processor is further configured, during operation, to execute instructions to:
transmit, via the communications interface, a radio frequency beacon signal; and
receive, via the communications interface, a reply to the beacon signal.

12. The apparatus of claim 11, wherein the processor is further configured, during operation, to execute instructions to:
transmit, via the communications interface, a confirmation of receipt of the reply to the beacon signal in response to receiving the reply to the beacon signal.

13. The apparatus of claim 1, wherein the processor is further configured, during operation, to execute instructions to establish network communications based on an election mechanism.

14. A method, comprising:
transmitting, from a first handheld coin-shaped apparatus, a radio frequency beacon signal, the first handheld coin-shaped apparatus including a processor, a communications interface, a power supply, and a rotatable portion, each of the processor and the communications interface electrically coupled to the power supply, the rotatable portion configured to control a supply of power from the power supply, the first handheld coin-shaped apparatus having a thickness of less than 7 millimeters;
receiving, at the first handheld coin-shaped apparatus and from a second handheld coin-shaped apparatus, a reply to the beacon signal; and
transmitting, from the first handheld coin-shaped apparatus and to the second handheld coin-shaped apparatus, and in response to receiving the reply to the beacon signal, a signal representing a confirmation of receipt of the reply to the beacon signal, thereby establishing a communications connection between the first handheld coin-shaped apparatus and the second handheld coin-shaped apparatus.

15. The method of claim 14, further comprising:
transmitting a keepalive signal from the first handheld coin-shaped apparatus to the second handheld coin-shaped apparatus.

16. The method of claim 15, wherein the transmitting the keepalive signal is performed periodically, at predetermined time intervals.

17. The method of claim 15, further comprising:
terminating the communications connection between the first handheld coin-shaped apparatus and the second handheld coin-shaped apparatus if a reply to the keepalive signal is not received within a predefined time period of the transmission of the keepalive signal.

18. A method, comprising:
monitoring, at a first handheld coin-shaped apparatus, a port of the first handheld coin-shaped apparatus for an incoming signal, the first handheld coin-shaped apparatus including a processor, a communications interface, a power supply, and a rotatable portion, each of the processor and the communications interface electrically coupled to the power supply, the rotatable portion configured to control a supply of power from the power supply, the first handheld coin-shaped apparatus having a thickness of less than 7 millimeters;
receiving, at the first handheld coin-shaped apparatus and from a second handheld coin-shaped apparatus, a beacon signal;
transmitting, from the first handheld coin-shaped apparatus and to the second handheld coin-shaped apparatus, an acknowledgment message in response to receiving the beacon signal; and
receiving, at the first handheld coin-shaped apparatus and from the second handheld coin-shaped apparatus, a signal representing a confirmation of receipt of the acknowledgment message, thereby establishing a communications connection between the first handheld coin-shaped apparatus and the second handheld coin-shaped apparatus.

19. A system, comprising:
a first handheld coin-shaped apparatus including an antenna, a processor, a memory, a power supply, a proximity sensor that utilizes a wireless communication frequency, and a housing including a rotatable portion to control a supply of power from the power supply, the first handheld coin-shaped apparatus having a thickness of less than 7 millimeters; and
a second handheld coin-shaped apparatus including an antenna, a processor, a memory, a power supply, a proximity sensor that utilizes a wireless communication frequency, and a housing, the second handheld coin-shaped apparatus having a thickness of less than 7 millimeters,
the first handheld coin-shaped apparatus configured to respond to the second handheld coin-shaped apparatus when the first handheld coin-shaped apparatus and the second handheld coin-shaped apparatus are within a predetermined range of each other, each handheld coin-shaped apparatus having its own network function capability such that the underlying network connectivity between the first handheld coin-shaped apparatus and the second handheld coin-shaped apparatus does not rely on internet peering, mobile data, or cellular service connection.

* * * * *